United States Patent
Kolodzieski et al.

(10) Patent No.: US 10,152,361 B2
(45) Date of Patent: Dec. 11, 2018

(54) EVENT STREAM PROCESSING CLUSTER MANAGER

(71) Applicant: SAS Institute Inc., Cary, NC (US)

(72) Inventors: Scott J. Kolodzieski, Apex, NC (US); Vincent L. Deters, Wake Forest, NC (US); Shu Huang, Cary, NC (US); Robert A. Levey, Morehead City, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/815,293

(22) Filed: Nov. 16, 2017

(65) Prior Publication Data

US 2018/0165139 A1 Jun. 14, 2018

Related U.S. Application Data

(60) Provisional application No. 62/449,430, filed on Jan. 23, 2017, provisional application No. 62/432,238, filed on Dec. 9, 2016.

(51) Int. Cl.
*G06F 9/54* (2006.01)
*G06F 9/445* (2018.01)

(52) U.S. Cl.
CPC .......... *G06F 9/542* (2013.01); *G06F 9/44505* (2013.01); *G06F 2209/544* (2013.01)

(58) Field of Classification Search
CPC . G06F 9/542; G06F 9/44505; G06F 2209/544
USPC ....................................................... 719/318
See application file for complete search history.

(56) References Cited

U.S. PATENT DOCUMENTS

| | | |
|---|---|---|
| 9,432,430 B1 | 8/2016 | Klenz |
| 2011/0023055 A1 | 1/2011 | Thatte et al. |
| 2012/0072455 A1 | 3/2012 | Jain et al. |
| 2014/0032745 A1 | 1/2014 | De Armas et al. |
| 2014/0280986 A1 | 9/2014 | Baulier et al. |

(Continued)

OTHER PUBLICATIONS

International Search Report and Written Opinion mailed in PCT Application No. PCT/US2017/062046, dated Jan. 23, 2018.

(Continued)

*Primary Examiner* — S. Sough
*Assistant Examiner* — Kimberly L Jordan
(74) *Attorney, Agent, or Firm* — Bell & Manning, LLC

(57) ABSTRACT

A first computing device manages a cluster of event stream processing (ESP) engines (ESPEs). A local ESP model is created based on information read from a manager configuration file that includes first connection information to connect to the second computing device and second connection information to connect the third computing device. An ESPE is instantiated on the first computing device based on the created local ESP model. The event block object is received from the second computing device in a first source window of the instantiated ESPE. A remote ESP model is deployed to a remote third computing device. The manager configuration file includes an indicator of the remote ESP model. The third computing device to receive the processed event block object is selected. The processed event block object is published to a second source window defined by the remote ESP model deployed to the third computing device.

30 Claims, 11 Drawing Sheets

(56) References Cited

U.S. PATENT DOCUMENTS

| | | | | |
|---|---|---|---|---|
| 2015/0358196 | A1* | 12/2015 | Baulier | G06F 11/2007 709/206 |
| 2016/0071027 | A1* | 3/2016 | Brand | G06N 5/02 706/12 |
| 2016/0328661 | A1* | 11/2016 | Reese | G06N 99/005 |

OTHER PUBLICATIONS

DataFlux Event Stream Processing Engine Primer, Version 1.3, Dec. 11, 2012.

DataFlux Event Stream Processing Engine User's Guide, Version 1.3, Jan. 24, 2013.

SAS® Event Stream Processing 4.2: Connectors and Adapters, Sep. 2016.

SAS® Event Stream Processing 4.2: Advanced Topics, Sep. 2016.

SAS® Event Stream Processing 4.2: Overview, Sep. 2016.

SAS® Event Stream Processing 4.2: XML Language Dictionary, Sep. 2016.

SAS® Event Stream Processing 4.2: Using the XML Layer, Sep. 2016.

\* cited by examiner

EVENT STREAM PROCESSING CLUSTER MANAGER

CROSS-REFERENCE TO RELATED APPLICATIONS

The present application claims the benefit of 35 U.S.C. § 119(e) to U.S. Provisional Patent Application No. 62/449,430 filed Jan. 23, 2017 and to U.S. Provisional Patent Application No. 62/432,238 filed Dec. 9, 2016, the entire contents of which are hereby incorporated by reference.

COMPUTER PROGRAM LISTING

A text file that includes a full extensible markup language example is labeled as Appendix A.txt, is referred to herein as Appendix A, and is hereby incorporated by reference in its entirety.

BACKGROUND

An increasing number of distributed applications process continuously flowing data from geographically distributed sources, perform analytics on the streamed data, and provide analysis results to entities that may also be geographically distributed. The continuously flowing data may be generated from sensor measurements that capture real-time data describing current operating characteristics of a remote device. The sensor measurements may derive from multiple different types of sensors installed at various locations (e.g., brakes, engine, steering mechanism, cooling system, passenger ventilation, power source, etc.) on a currently-moving vehicle, aircraft or watercraft, for example.

Event stream processing (ESP) can be used to analyze and understand millions of events per second, while detecting patterns of interest as they occur in real time. While processing with submillisecond response times for high-volume throughput, data streams can be assessed with ESP to derive insights and take appropriate actions.

SUMMARY

In an example embodiment, a computer-readable medium is provided having stored thereon computer-readable instructions that when executed by a first computing device, cause the first computing device to manage a cluster of event stream processing engines. A local event stream processing (ESP) model is created based on information read from a manager configuration file. The local ESP model describes first computational processes to be performed on one or more first fields of an event block object when the event block object is received by the first computing device from a second computing device remote from the first computing device. The manager configuration file includes first connection information to connect the second computing device and the first computing device. An ESP engine (ESPE) is instantiated on the first computing device based on the created local ESP model. The event block object is received from the second computing device in a first source window of the instantiated ESPE. The first source window is defined by the created local ESP model. The received event block object is processed based on the created local ESP model. A remote ESP model is deployed to a third computing device remote from the first computing device and from the second computing device. The remote ESP model describes second computational processes to be performed on one or more second fields of the processed event block object when the processed event block object is received by the third computing device from the first computing device. The manager configuration file further includes an indicator of the remote ESP model and second connection information to connect the third computing device and the first computing device. The third computing device to receive the processed event block object is selected. The processed event block object is published to a second source window defined by the remote ESP model deployed to the third computing device.

In some embodiments, a router configuration file is created based on information read from the manager configuration file, wherein the router configuration file describes routing of the event block object from the second computing device to the third computing device. A router engine is instantiated on the first computing device based on the created router configuration file, wherein the instantiated router engine selects the third computing device to receive the processed event block object based on the created router configuration file. The processed event block object is published to the second source window based on the created router configuration file.

In some embodiments, the instantiated router engine selects the third computing device from a plurality of remote computing devices.

In some embodiments, when the router configuration file indicates that the event block object from the second computing device is multicast, the instantiated router engine selects each of the plurality of remote computing devices and publishes the processed event block object to the second source window at each of the plurality of remote computing devices.

In some embodiments, when the router configuration file indicates that the event block object from the second computing device is sent to a single computing device, the instantiated router engine selects the third computing device from the plurality of remote computing devices.

In some embodiments, the third computing device is selected from the plurality of remote computing devices by successively selecting a different computing device from the plurality of remote computing devices to which to publish the event block object.

In some embodiments, the third computing device is selected from the plurality of remote computing devices by reading a value from a predefined field of the event block object and selecting the third computing device from the plurality of remote computing devices based on the read value.

In some embodiments, the third computing device is selected from the plurality of remote computing devices by reading a value from a predefined field of the event block object, computing a hash value from the read value, and selecting the third computing device from the plurality of remote computing devices based on the computed hash value.

In some embodiments, a router configuration file is created based on information read from the manager configuration file, wherein the router configuration file describes routing of the event block object from the second computing device to the third computing device. A router engine is instantiated on the first computing device based on the created router configuration file. The instantiated router engine starts a connector between the first computing device and the second computing device to receive the event block object based on the created router configuration file.

In some embodiments, the instantiated router engine starts a plurality of connectors between the first computing device and a plurality of publishing computing devices that each receive different event block objects, wherein the second computing device is one of the plurality of publishing computing devices.

In some embodiments, the plurality of connectors are started in an order determined from the created router configuration file.

In some embodiments, a group of the plurality of connectors is started together based on the created router configuration file.

In some embodiments, a second connector of the plurality of connectors is started after the connector is started based on the created router configuration file.

In some embodiments, a second connector of the plurality of connectors is started after the connector is indicated as finished processing based on the created router configuration file.

In some embodiments, a second connector of the plurality of connectors is started after the connector is indicated as stopped processing based on the created router configuration file.

In another example embodiment, the first computing device is provided. The first computing device includes, but is not limited to, a processor and a computer-readable medium operably coupled to the processor. The computer-readable medium has instructions stored thereon that, when executed by the processor, cause the first computing device to manage a cluster of event stream processing engines.

In yet another example embodiment, a method of managing a cluster of event stream processing engines is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
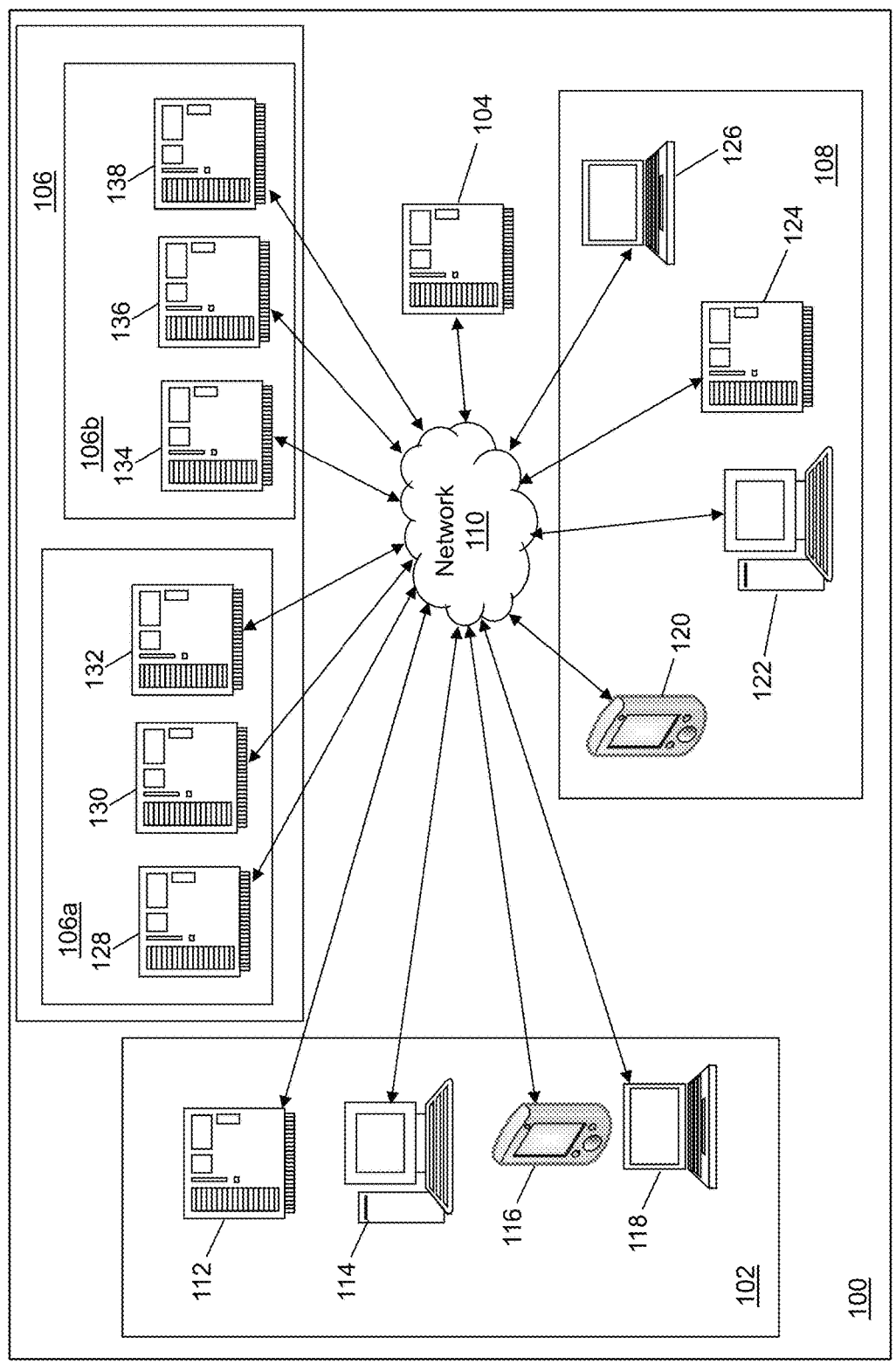
FIG. 1 depicts a block diagram of a stream processing system in accordance with an illustrative embodiment.

Referring to FIG. 1, a block diagram of a stream processing system 100 is shown in accordance with an illustrative embodiment. In an illustrative embodiment, stream processing system 100 may include an event publishing system 102, a cluster manager device 104, an event stream processing (ESP) cluster system 106, an event subscribing system 108, and a network 110. Each of event publishing system 102, cluster manager device 104, ESP cluster system 106, and event subscribing system 108 may be composed of one or more discrete devices in communication through network 110. Cluster manager device 104 and ESP cluster system 106 may be integrated into one or more computing devices.

Event publishing system 102 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a power grid system, a telecommunications system, a fluid (e.g., oil, gas, water, etc.) pipeline, a transportation system, an industrial device, a medical device, an appliance, a vehicle, a computing device, etc. Example sensors include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

For example, a truck may be equipped with hundreds of sensors though as autonomous vehicle technology advances, the number of sensors is increasing rapidly. These sensors stream all types of events that are valuable to both a truck driver and a truck manufacturer. Some events require immediate reactions via Edge Analytics while others need to be processed in the Cloud where more comprehensive and detailed analysis is performed. However, the deployment of analytic tools and models in the Cloud that meets the requirements of large scale, geographically distributed, and highly dynamic sensors is challenging.

Event publishing system 102 publishes the measurement data value to cluster manager device 104 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. Cluster manager device 104 receives the measurement data value in an event stream, processes the measurement data value, and identifies a computing device of ESP cluster system 106 to which the processed measurement data value is sent. ESP cluster system 106 may further process the measurement data value before sending the processed measurement data value to one or more computing devices of event subscribing system 108.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of communication devices.

The one or more computing devices of event publishing system 102 may include computing devices of any form factor such as a server computer 112, a desktop 114, a smart phone 116, a laptop 118, a personal digital assistant, an integrated messaging device, a tablet computer, a point of sale system, a transaction system, etc. Event publishing system 102 can include any number and any combination of form factors of computing devices that may be organized into subnets. The computing devices of event publishing system 102 send and receive signals through network 110 to/from another of the one or more computing devices of event publishing system 102 and/or to/from cluster manager device 104. The one or more computing devices of event publishing system 102 may communicate using various transmission media that may be wired and/or wireless as understood by those skilled in the art. The one or more computing devices of event publishing system 102 may be geographically dispersed from each other and/or co-located. Each computing device of the one or more computing devices of event publishing system 102 may be executing one or more event publishing application.

Figure 2:
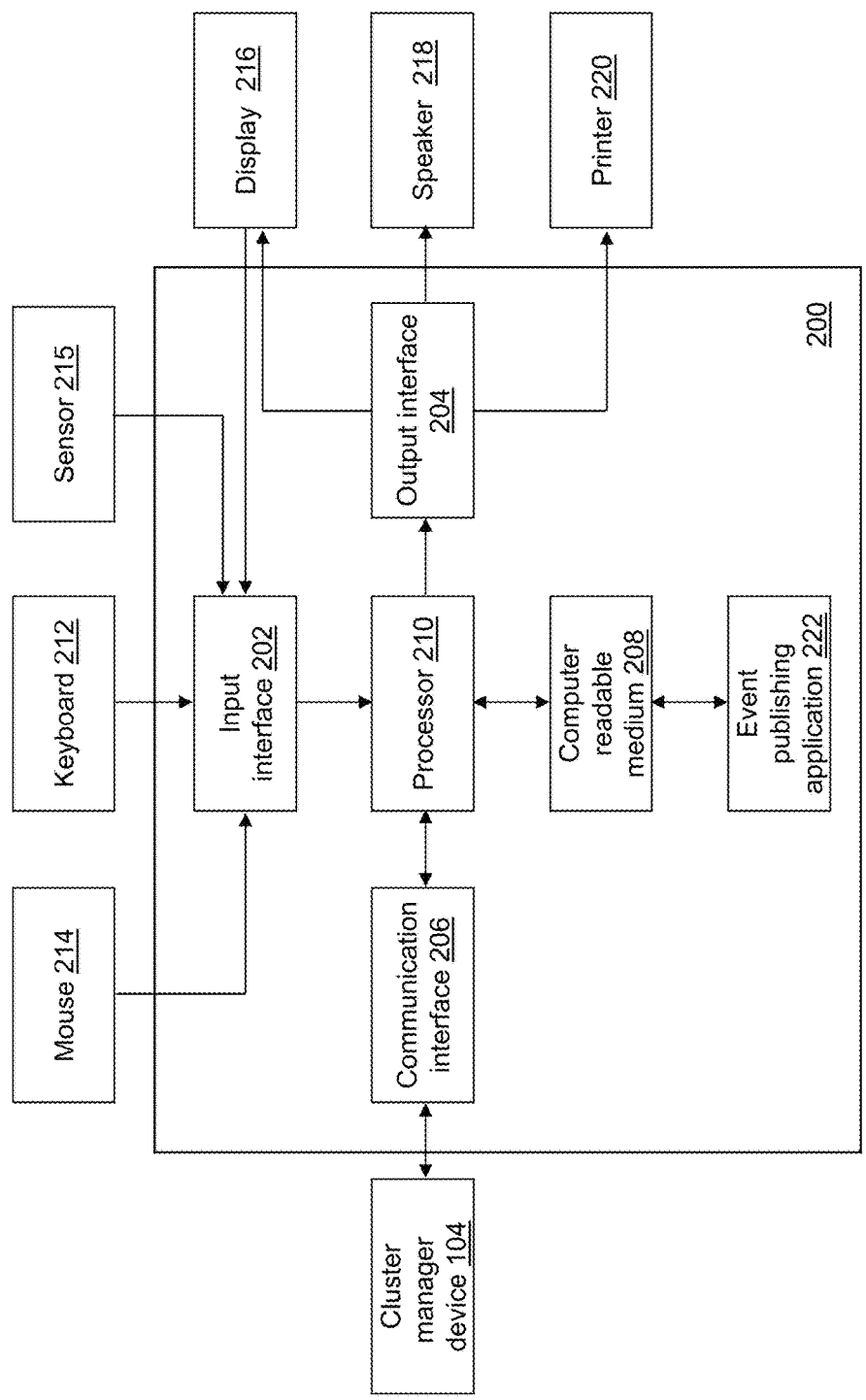
FIG. 2 depicts a block diagram of an event publishing device of an event publishing system of the stream processing system of FIG. 1 in accordance with an illustrative embodiment.

For illustration, referring to FIG. 2, a block diagram of an event publishing device 200 is shown in accordance with an example embodiment. Event publishing device 200 is an example computing device of event publishing system 102. For example, each of server computer 112, desktop 114, smart phone 116, and laptop 118 may be an instance of event publishing device 200. Event publishing device 200 may include an input interface 202, an output interface 204, a communication interface 206, a computer-readable medium 208, a processor 210, and an event publishing application 222. Each computing device of event publishing system 102 may be executing event publishing application 222 of the same or different type.

Referring again to FIG. 1, the one or more computing devices of event subscribing system 108 may include computers of any form factor such as a smart phone 120, a desktop 122, a server computer 124, a laptop 126, a personal digital assistant, an integrated messaging device, a tablet computer, etc. Event subscribing system 108 can include any number and any combination of form factors of computing devices. The computing devices of event subscribing system 108 send and receive signals through network 110 to/from cluster manager device 104 and/or to/from ESP cluster system 106. The one or more computing devices of event subscribing system 108 may be geographically dispersed from each other and/or co-located. The one or more computing devices of event subscribing system 108 may communicate using various transmission media that may be wired and/or wireless as understood by those skilled in the art. Each computing device of the one or more computing devices of event subscribing system 108 may be executing one or more event subscribing application.

Figure 5:
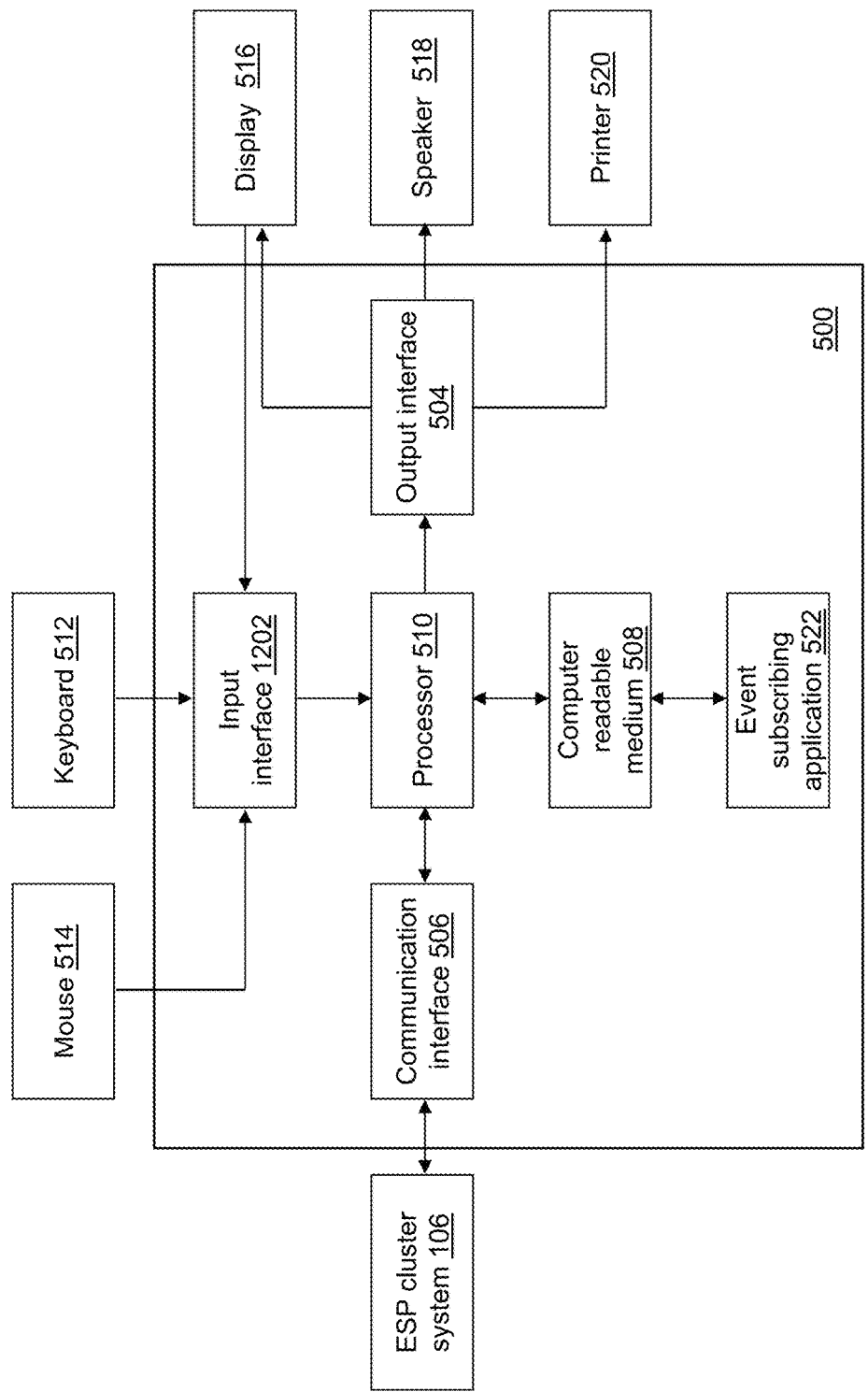
FIG. 5 depicts a block diagram of an event subscribing device of an event subscribing system of the stream processing system of FIG. 1 in accordance with an illustrative embodiment.

For illustration, referring to FIG. 5, a block diagram of an event subscribing device 500 is shown in accordance with an example embodiment. Event subscribing device 500 is an example computing device of event subscribing system 108. For example, each of smart phone 120, a desktop 122, a server computer 124, a laptop 126 may be an instance of event subscribing device 500. Event subscribing device 500 may include a second input interface 502, a second output interface 504, a second communication interface 506, a second computer-readable medium 508, a second processor 510, and an event subscribing application 522. Each computing device of event subscribing system 108 may be executing event subscribing application 522 of the same or different type.

Referring again to FIG. 1, cluster manager device 104 can include any form factor of computing device. For illustration, FIG. 1 represents cluster manager device 104 as a server computer. In general, a server computer may include faster processors, additional processors, more disk memory, and/or more random access memory (RAM) than a client computer and support multi-threading as understood by a person of skill in the art. Cluster manager device 104 sends and receives signals through network 110 to/from event publishing system 102 and/or to/from ESP cluster system 106 and/or to/from event subscribing system 108. Cluster manager device 104 may communicate using various transmission media that may be wired and/or wireless as understood by those skilled in the art. Cluster manager device 104 may be implemented on a plurality of computing devices of the same or different type. Stream processing system 100 further may include a plurality of ESP cluster managers.

Figure 7:
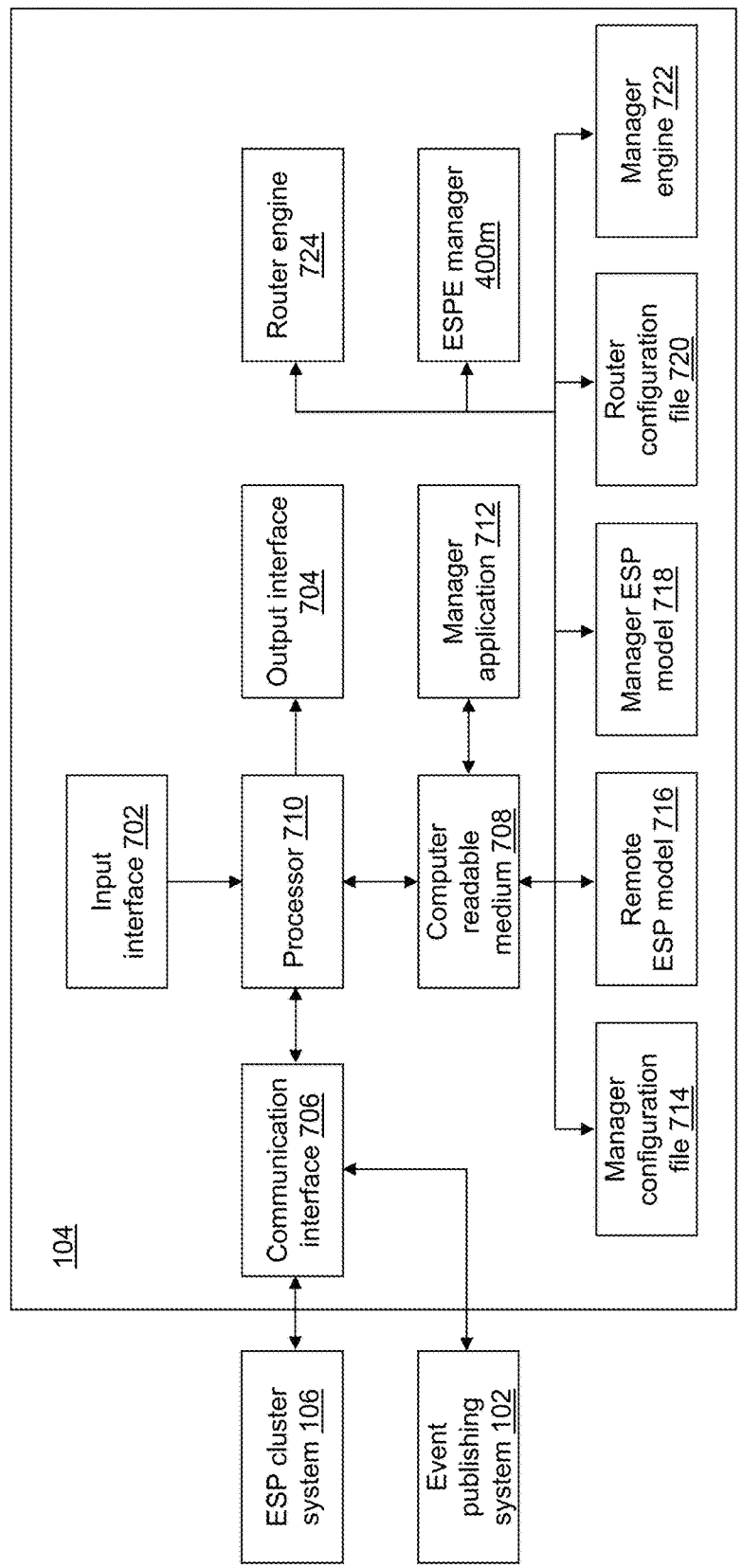
FIG. 7 depicts a block diagram of a cluster manager device of the stream processing system of FIG. 1 in accordance with an illustrative embodiment.

For illustration, referring to FIG. 7, a block diagram of cluster manager device 104 is shown in accordance with an example embodiment. Cluster manager device 104 may include a third input interface 702, a third output interface 704, a third communication interface 706, a third computer-readable medium 708, a third processor 710, and a manager application 712. Cluster manager device 104 executes manager application 712 that reads a manager configuration file 714 and a remote ESP model 716 to create a manager ESP model 718 and a router configuration file 720, which are used to instantiate a manager engine 722, an ESP engine (ESPE) manager 400m and a router engine 724. More specifically, in an illustrative embodiment, execution of manager application 712 instantiates manager engine 722, which instantiates ESPE manager 400m as defined in manager ESP model 718 and router engine 724 as defined in router configuration file 720. Manager engine 722 adds an XML layer on top of ESPE manager 400m. For example, manager engine 722 understands the syntax of an XML model and translates it to something ESPE manager 400m understands.

Manager configuration file 714 further contains a list of remote computing devices of ESP cluster system 106. Cluster manager device 104 may instruct the remote computing devices of ESP cluster system 106 to run remote ESP model 716.

Referring again to FIG. 1, the one or more computing devices of ESP cluster system 106 may include computing devices of any form factor that may be organized into one or more clusters. For example, in the illustrative embodiment, ESP cluster system 106 includes a first ESP cluster system 106a and a second ESP cluster system 106b. In the illustrative embodiment, first ESP cluster system 106a may include a first server computer 128, a second server computer 130, and a third server computer 132, and second ESP cluster system 106b may include a fourth server computer 134, a fifth server computer 136, and a sixth server computer 138. ESP cluster system 106 can include any number and any combination of form factors of computing devices. The computing devices of ESP cluster system 106 send and receive signals through network 110 to/from another of the one or more computing devices of event subscribing system 108 and/or to/from cluster manager device 104. The one or more computing devices of ESP cluster system 106 may communicate using various transmission media that may be wired and/or wireless as understood by those skilled in the art. The one or more computing devices of ESP cluster system 106 may be geographically dispersed from each other and/or co-located.

Figure 10:
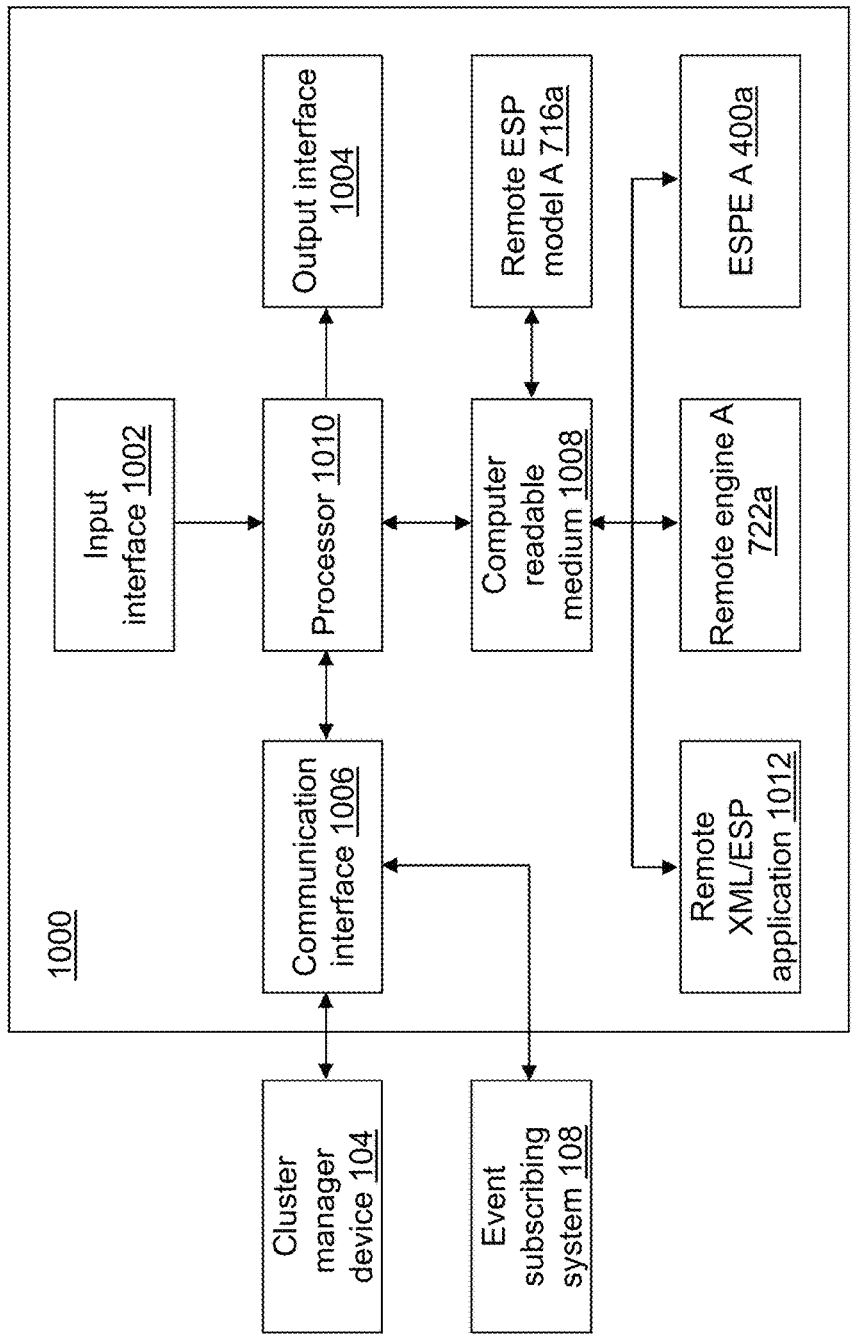
FIG. 10 depicts a block diagram of an ESP cluster device of the ESP cluster system of the stream processing system of FIG. 1 in accordance with an illustrative embodiment.

For illustration, referring to FIG. 10, a block diagram of an ESP cluster device 1000 is shown in accordance with an example embodiment. ESP cluster device 1000 is an example computing device of ESP cluster system 106. For example, each of first server computer 128, second server computer 130, third server computer 132, fourth server computer 134, fifth server computer 136, and sixth server computer 138 may be an instance of ESP cluster device 1000. ESP cluster device 1000 may include a fourth input interface 1002, a fourth output interface 1004, a fourth communication interface 1006, a fourth computer-readable medium 1008, a fourth processor 1010, and a remote XML/ESP application 1012. Each computing device of ESP cluster system 106 may be executing remote XML/ESP application 1012 of the same or different type. ESP cluster device 1000 may be executing remote XML/ESP application 1012 that instantiates a remote engine A 722a. Remote engine A 722a reads a remote ESP model A 716a to instantiate an ESPE A 400a. Remote ESP model A 716a may be a copy of remote ESP model 716. Alternatively, remote ESP model 716 may not be stored on third computer-readable medium 708, but on fourth computer-readable medium 1008 or another computer-readable medium accessible by ESP cluster device 1000 using fourth input interface 1002 and/or fourth communication interface 1006. For illustration, remote ESP model 716 is sent to ESP cluster system 106 as an ESP model in XML format. Remote ESP model 716 may be accessed by manager engine using a uniform resource locator (URL) to a file on a local file system or on a web server. Remote ESP model A 716a also may be accessed by ESP cluster device 1000 using the URL. For illustration, a file on a local file system may be accessed using file:///MODELS/sensors/model.xml, or a general reference served up from a web server using http://ESP-Models/Sensor/model.xml.

Referring to FIG. 2, each event publishing device 200 of event publishing system 102 may include the same or different components and combinations of components. Fewer, different, and additional components may be incorporated into event publishing device 200. Event publishing device 200 may be part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things. For example, event publishing device 200 can include one or more types of the same or different sensors, and high value analytics can be applied to identify hidden relationships and drive increased efficiencies. This can apply to both big data analytics and real-time analytics. Event publishing device 200 may be referred to as an edge device, and may include edge computing circuitry. Event publishing device 200 may provide a variety of stored or generated data, such as network data or data specific to the network devices themselves.

In one example application, ESP can be employed for predictive maintenance in the trucking industry, which is responsible for moving around 10.5 billion tons of freight over 279 billion miles per year. ESP can be used to predict part failures and keep trucks on the road longer. Trucks may have hundreds of sensors that collect many different types of data, for example, from oil temperatures to engine load to turbo boost. Edge devices on the trucks can allow a trucking company to weed out data they don't need as close to the source as possible, and can facilitate action to occur on pertinent information in sub-second time frames. This way, the trucking company does not have to move all of their data through a network or even store it in the cloud or on premises in some situations. Also, by monitoring, filtering and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on premises or in the cloud, where the trucking company can be enabled to analyze massive amounts of data across a fleet of trucks. Cross-entity analytics can be performed by aggregating data from all of the IoT gateways that are installed on their trucks in their fleet.

ESP can further be use enable the trucking company to take what it learned from the historical data, train new models, update existing models, and bring the new or revised models back to the edge (e.g., the truck). These operations can be performed dynamically (e.g., on the fly) and while the trucks are still out on the roads.

Input interface 202 provides an interface for receiving information for entry into event publishing device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into event publishing device 200 or to make selections presented in a user interface displayed on display 216. Input interface 202 further may interface with another device such as a sensor 215 to receive a measurement data value obtained by sensor 215. Input interface 202 further may interface with a plurality of sensors or other devices of the same or different type. The same interface may support both input interface 202 and output interface 204. For example, display 216 that includes a touch screen both allows user input and presents output to the user. Event publishing device 200 may have one or more input interfaces that use the same or a different input interface technology. The input interface technology further may be accessible by event publishing device 200 through communication interface 206.

Output interface 204 provides an interface for outputting information for review by a user of event publishing device 200. For example, output interface 204 may interface with various output technologies including, but not limited to, display 216, a speaker 218, a printer 220, etc. Event publishing device 200 may have one or more output interfaces that use the same or a different interface technology. The output interface technology further may be accessible by event publishing device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Event publishing device 200 may have one or more communication interfaces that use the same or a different communication interface technology. For example, event publishing device 200 may support communication using an Ethernet port, a Bluetooth antenna, a telephone jack, a USB port, etc. Data and messages may be transferred between event publishing device 200 and Cluster manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Event publishing device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Event publishing device 200 also may have one or more drives that support the loading of a memory media such as a CD or DVD, an external hard drive, etc. One or more external hard drives further may be connected to event publishing device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Event publishing device 200 may include a plurality of processors that use the same or a different processing technology.

Event publishing application 222 performs operations associated with generating, capturing, and/or receiving a measurement data value and publishing the measurement data value in an event stream to one or more computing devices of event subscribing system 108 directly or indirectly through Cluster manager device 104 and/or the one or more computing devices of ESP cluster system 106. The operations may be implemented using hardware, firmware, software, or any combination of these methods. Referring to the example embodiment of FIG. 2, event publishing application 222 is implemented in software (comprised of computer-readable and/or computer-executable instructions) stored in computer-readable medium 208 and accessible by processor 210 for execution of the instructions that embody the operations of event publishing application 222. Event publishing application 222 may be written using one or more programming languages, assembly languages, scripting languages, etc.

Event publishing application 222 may be implemented as a Web application. For example, event publishing application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a URL that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Figure 3:
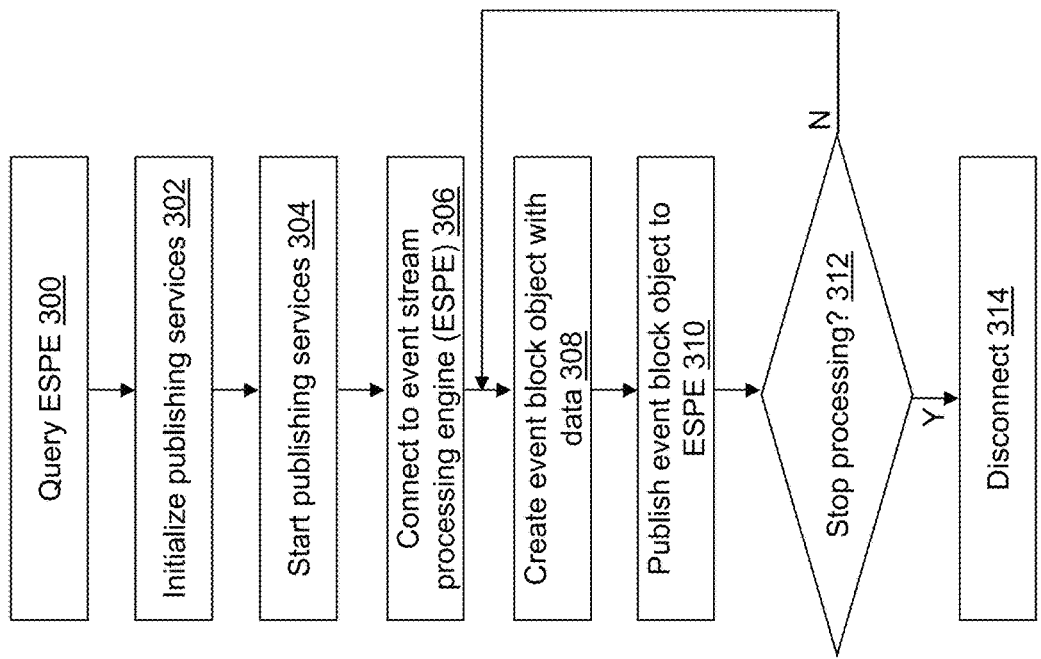
FIG. 3 depicts a flow diagram illustrating examples of operations performed by the event publishing device of FIG. 2 in accordance with an illustrative embodiment.

Referring to FIG. 3, example operations associated with event publishing application 222 are described. Additional, fewer, or different operations may be performed depending on the embodiment. The order of presentation of the operations of FIG. 3 is not intended to be limiting. A user can interact with one or more user interface windows presented to the user in a display under control of event publishing application 222 independently or through a browser application in an order selectable by the user. Although some of the operational flows are presented in sequence, the various operations may be performed in various repetitions, concurrently, and/or in other orders than those that are illustrated. For example, a user may execute event publishing application 222, which causes presentation of a first user interface window, which may include a plurality of menus and selectors such as drop down menus, buttons, text boxes, hyperlinks, etc. associated with event publishing application 222 as understood by a person of skill in the art. As further understood by a person of skill in the art, various operations may be performed in parallel, for example, using a plurality of threads or a plurality of computing devices such as a grid or a cloud of computing devices.

Figure 4:
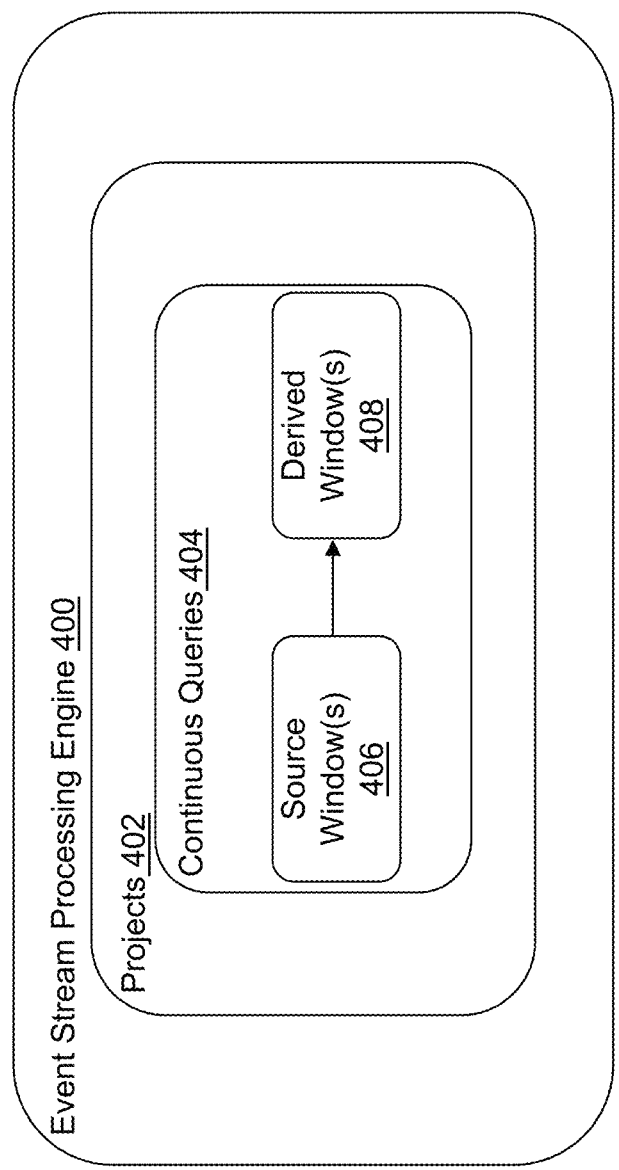
FIG. 4 depicts a block diagram of an event stream processing (ESP) engine executing on an ESP device of the stream processing system of FIG. 1 in accordance with an illustrative embodiment.

In an operation 100, an ESPE 400 is queried, for example, to discover projects 402, continuous queries 404, windows 406, 408, window schema, and window edges currently running in ESPE 400. For example, referring to FIG. 4, the components of ESPE 400 (e.g., ESPE manager 400*m* and ESPE A 400*a*) are shown in accordance with an illustrative embodiment. In an illustrative embodiment, event publishing device 200 queries ESPE manager 400*m*. ESPE 400 may include one or more projects 402. A project may be described as a second-level container in an engine model managed by ESPE 400 where a thread pool size for the project may be defined by a user. A value of one for the thread pool size indicates that writes are single-threaded. Each project of the one or more projects 402 may include one or more continuous queries 404 that contain data flows, which are data transformations of incoming event streams. The one or more continuous queries 404 may include one or more source windows 406 and one or more derived windows 408.

The engine container is the top-level container in a model that manages the resources of the one or more projects 402. In an illustrative embodiment, for example, there is a single ESPE 400 for each instance of an ESP model executed. Each ESPE 400 has a unique engine name. Additionally, the one or more projects 402 may each have unique project names, and each query may have a unique continuous query name and begin with a uniquely named source window of the one or more source windows 406. Each ESPE 400 may or may not be persistent. Each ESPE 400 is a unique process so the projects/queries/windows need not be uniquely named. They are distinguished by the unique input streams received on ESPE-specific TCP/IP connections.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 406 and the one or more derived windows 408 represent continuously executing queries that generate updates to a query result set as new event blocks stream through ESPE 400. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 400 can support the opcodes for events including insert, update, upsert, and delete. As a result, events entering a source window of the one or more source windows 406 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 200, a data transmit time by event publishing device 200, a data receipt time by ESPE manager 400*m* or ESPE A 400*a*, etc.

An event block object may be described as a grouping or package of one or more event objects. An event stream may be described as a flow of event block objects. A continuous query of the one or more continuous queries 404 transforms the incoming event stream made up of streaming event block objects published into ESPE 400 into one or more outgoing event streams using the one or more source windows 406 and the one or more derived windows 408. A continuous query can also be thought of as data flow modeling.

The one or more source windows 406 are at the top of the directed graph and have no windows feeding into them. Event streams are published into the one or more source windows 406, and from there, the event streams are directed to the next set of connected windows as defined by the directed graph. The one or more derived windows 408 are all instantiated windows that are not source windows and that have other windows streaming events into them. The one or more derived windows 408 perform computations or transformations on the incoming event streams. The one or more derived windows 408 transform event streams based on the window type (that is operators such as join, filter, compute, aggregate, copy, pattern match, procedural, union, etc.) and window settings. As event streams are published into ESPE 400, they are continuously queried, and the resulting sets of derived windows in these queries are continuously updated.

Referring again to FIG. 3, the engine name and host/port to ESPE 400 may be provided as an input to the query and a list of strings may be returned with the names of the projects 402, of the continuous queries 404, of the windows 406, 408, of the window schema, and/or of the window edges of currently running projects of ESPE 400. The host is associated with a host name or Internet Protocol (IP) address of cluster manager device 104. The port is the port number provided when a publish/subscribe (pub/sub) capability is initialized by ESPE 400. The engine name is the name of ESPE 400 such as the engine name of ESPE manager 400*m*. The engine name of ESPE 400 and host/port to cluster manager device 104 may be read from a storage location on computer-readable medium 208, may be provided on a command line, or otherwise input to or defined by event publishing application 222 as understood by a person of skill in the art.

In an operation 302, publishing services are initialized.

In an operation 304, the initialized publishing services are started, which may create a publishing client for the instantiated event publishing application 222. The publishing client performs the various pub/sub activities for the instantiated event publishing application 222. For example, a string representation of a URL to ESPE 400 is passed to a "Start" function. For example, the URL may include the host:port designation of ESPE manager 400*m* executing on cluster manager device 104, a project of the projects 402, a continuous query of the continuous queries 404, and a window of the source windows 406. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 222 is publishing to more than one source window of ESPE manager 400*m*, the initialized publishing services may be started to each source window using the associated names (project name, continuous query name, source window name).

Pub/sub is a message-oriented interaction paradigm based on indirect addressing. Subscribers (e.g., cluster manager device 104, ESP cluster device 1000, event subscribing device 500) specify their interest in receiving information from ESPE 400 by subscribing to specific classes of events, while information sources (event publishing device 200, cluster manager device 104, ESP cluster device 1000) publish events to ESPE 400 without directly addressing the data recipients. Stream processing system 100 includes ESPE manager 400m that receives events from event publishing application 222 executing on event publishing device 200 of event publishing system 102 and that publishes processed events to ESPE A 400a of ESP cluster device 1000 of ESP cluster system 106. ESPE A 400a of ESP cluster device 1000 of ESP cluster system 106 receives events from ESPE manager 400m and publishes further processed events to event subscribing application 522 of event subscribing device 500 of event subscribing system 108.

In an operation 306, a connection is made between event publishing application 222 and ESPE 400, such as ESPE manager 400m executing on cluster manager device 104, for each source window of the source windows 406 to which any measurement data value is published. To make the connection, the pointer to the created publishing client may be passed to a "Connect" function. If event publishing application 222 is publishing to more than one source window of ESPE 400, a connection may be made to each started window using the pointer returned for the respective "Start" function call.

In an operation 308, an event block object is created by event publishing application 222 that includes a measurement data value. The measurement data value may have been received, captured, generated, etc., for example, through communication interface 206 or input interface 202 or by processor 210. The measurement data value may be processed before inclusion in the event block object, for example, to change a unit of measure, convert to a different reference system, etc. The event block object may include a plurality of measurement data values measured at different times and/or by different devices.

In an operation 310, the created event block object is published to ESPE 400, for example, using the pointer returned for the respective "Start" function call to the appropriate source window. Event publishing application 222 passes the created event block object to the created publishing client, where the unique ID field in the event block object has been set by event publishing application 222 possibly after being requested from the created publishing client. In an illustrative embodiment, event publishing application 222 may wait to begin publishing until a "Ready" callback has been received from the created publishing client. The event block object is injected into the source window, continuous query, and project associated with the started publishing client.

In an operation 312, a determination is made concerning whether or not processing is stopped. If processing is not stopped, processing continues in operation 308 to continue creating and publishing event block objects that include measurement data values. If processing is stopped, processing continues in an operation 314.

In operation 314, the connection made between event publishing application 222 and ESPE 400 through the created publishing client is disconnected, and each started publishing client is stopped.

Referring to FIG. 5, fewer, different, and additional components may be incorporated into event subscribing device 500. Each event subscribing device 500 of event subscribing system 108 may include the same or different components or combination of components.

Second input interface 502 provides the same or similar functionality as that described with reference to input interface 202 of event publishing device 200 though referring to event subscribing device 500. Second output interface 504 provides the same or similar functionality as that described with reference to output interface 204 of event publishing device 200 though referring to event subscribing device 500. Second communication interface 506 provides the same or similar functionality as that described with reference to communication interface 206 of event publishing device 200 though referring to event subscribing device 500. Data and messages may be transferred between event subscribing device 500 and cluster manager device 104 and/or ESP cluster 106 using second communication interface 506. Second computer-readable medium 508 provides the same or similar functionality as that described with reference to computer-readable medium 208 of event publishing device 200 though referring to event subscribing device 500. Second processor 510 provides the same or similar functionality as that described with reference to processor 210 of event publishing device 200 though referring to event subscribing device 500.

Figure 6:
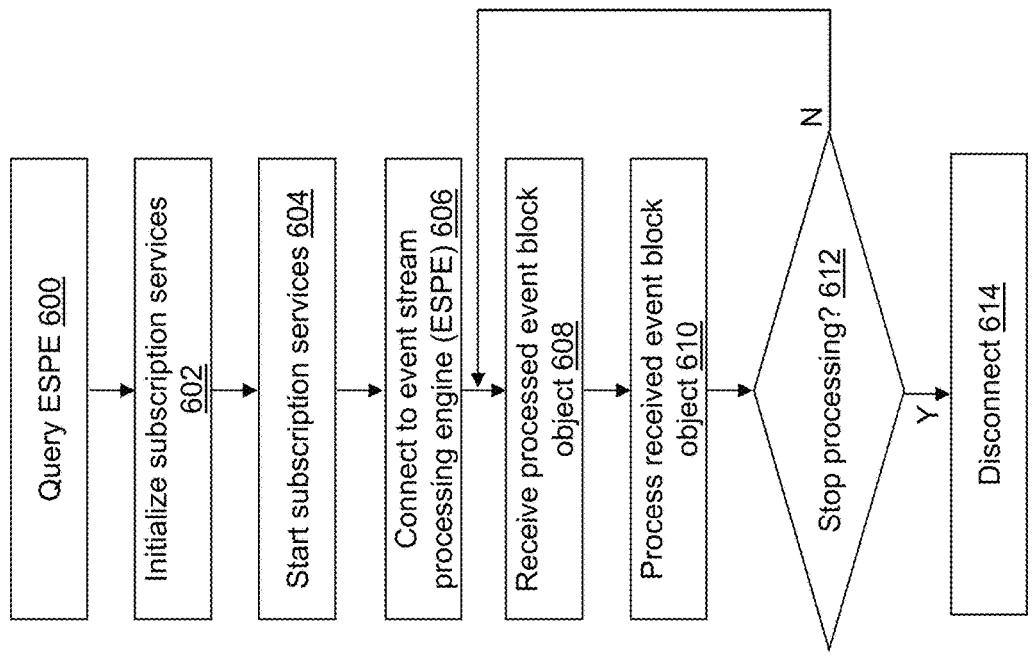
FIG. 6 depicts a flow diagram illustrating examples of operations performed by the event subscribing device of FIG. 5 in accordance with an illustrative embodiment.

Referring to FIG. 6, example operations associated with event subscribing application 512 are described. Additional, fewer, or different operations may be performed depending on the embodiment. The order of presentation of the operations of FIG. 6 is not intended to be limiting.

Similar to operation 300, in an operation 600, ESPE 400 is queried, for example, to discover names of projects 402, of continuous queries 404, of windows 406,608, of window schema, and of window edges currently running in ESPE 400. The host name of the device executing ESPE 400, the engine name of ESPE 400, and the port number opened by ESPE 400 are provided as an input to the query and a list of strings may be returned with the names to the projects 402, continuous queries 404, windows 406,608, window schema, and/or window edges. Because event subscribing device 500 connects to ESPE A 400a of ESP cluster device 1000 of ESP cluster system 106, the host name of ESP cluster device 1000 and the port number to which ESPE A 400a of ESP cluster device 1000 supports pub/sub may be provided as an input to the query.

In an operation 602, subscription services are initialized.

In an operation 604, the initialized subscription services are started, which may create a subscribing client on behalf of event subscribing application 512 at event subscribing device 500. The subscribing client performs the various pub/sub activities for event subscribing application 512. For example, a URL to ESPE 400, such as ESPE A 400a of ESP cluster device 1000 of ESP cluster system 106, may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 606, a connection may be made between event subscribing application 512 executing on event subscribing device 500 and ESPE A 400a through the created subscribing client. To make the connection, the pointer to the created subscribing client may be passed to a "Connect" function and a mostly non-busy wait loop created to wait for receipt of event block objects. For example, the connection may be made to one or more computing devices of ESP cluster system 106.

In an operation 608, an event block object is received by event subscribing application 512 executing on event subscribing device 500.

In an operation 610, the received event block object is processed based on the operational functionality provided by event subscribing application 512. For example, event subscribing application 512 may extract data from the received event block object and store the extracted data in a database. In addition, or in the alternative, event subscribing application 512 may extract data from the received event block object and send the extracted data to a system control operator display system, an automatic control system, a notification device, an analytic device, etc. In addition, or in the alternative, event subscribing application 512 may extract data from the received event block object and send the extracted data to a post-incident analysis device to further analyze the data. Event subscribing application 512 may perform any number of different types of actions as a result of extracting data from the received event block object. The action may involve presenting information on a second display 516 or a second printer 520, presenting information using a second speaker 518, storing data in second computer-readable medium 522, sending information to another device using second communication interface 506, etc. A user may further interact with presented information using a second mouse 514 and/or a second keyboard 512.

In an operation 612, a determination is made concerning whether or not processing is stopped. If processing is not stopped, processing continues in operation 608 to continue receiving and processing event block objects. If processing is stopped, processing continues in an operation 614.

In operation 614, the connection made between event subscribing application 512 and ESPE A 400a through the subscribing client is disconnected, and the subscribing client is stopped.

Referring to FIG. 7, fewer, different, or additional components may be incorporated into cluster manager device 104. Cluster manager device 104 receives event block objects that include measurement data values from event publishing system 102. Before receiving event block objects, ESPE manager 400m may be executing on cluster manager device 104. Though not shown, third computer-readable medium 708 may provide an electronic storage medium for the received event block objects.

Third input interface 702 provides the same or similar functionality as that described with reference to input interface 202 of event publishing device 200 though referring to cluster manager device 104. Third output interface 704 provides the same or similar functionality as that described with reference to output interface 204 of event publishing device 200 though referring to cluster manager device 104. Third communication interface 706 provides the same or similar functionality as that described with reference to communication interface 206 of event publishing device 200 though referring to cluster manager device 104. Data and messages may be transferred between cluster manager device 104 and event publishing system 102, ESP cluster system 106, and/or event subscribing system 108 using third communication interface 706. Third computer-readable medium 708 provides the same or similar functionality as that described with reference to computer-readable medium 208 of event publishing device 200 though referring to cluster manager device 104. Third processor 710 provides the same or similar functionality as that described with reference to processor 210 of event publishing device 200 though referring to cluster manager device 104.

Manager application 712 performs operations associated with coordinating event stream flow between event publishing system 102 and event subscribing system 108 through the one or more computing devices of ESP cluster system 106. The operations may be implemented using hardware, firmware, software, or any combination of these methods. Referring to the example embodiment of FIG. 7, manager application 712 is implemented in software (comprised of computer-readable and/or computer-executable instructions) stored in third computer-readable medium 708 and accessible by third processor 710 for execution of the instructions that embody the operations of manager application 712. Manager application 712 may be written using one or more programming languages, assembly languages, scripting languages, etc. Manager application 712 may be implemented as a Web application.

Manager application 712 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable manager application 712 to instantiate manager engine 722 and to embed ESPE manager 400m, possibly with dedicated thread pools into its own process space. Alternatively, ESPE manager 400m can be embedded into the process space of manager engine 722, for example, using a C++ modeling layer of SAS ESP. In that case, manager engine 722 is focused on its own chores and interacts with ESPE manager 400m as needed.

For further illustration, manager application 712 may be implemented using an XML Layer defined for SAS® ESP. The XML Layer enables definition of ESPE manager 400m with dynamic project creations and deletions. For example, manager engine 722 as an XML client can feed definitions read from remote ESP model 716 into remote engine A 722a executing on each computing device, such as ESP cluster device 1000, of ESP cluster system 106.

Remote ESP model 716 may be designed to perform real-time analytics on streams of events from event publishing system 102 and to provide the results to event subscribing system 108. Illustrative use cases for ESP include, but are not limited to, sensor data monitoring and management, fraud detection and prevention, cyber security analytics, operational systems monitoring and management, capital markets trading systems, etc. The basic syntax for an XML model for ESPE 400 (e.g., ESPE A 400a, ESPE manager 400m) is

```
<engine>
  <projects>
   +<project>
    <contqueries>
     +<contquery>
      <windows>
       +<window-type> </window-type>
      </windows>
      <edges>
       +<edge> </edge>
      </edges>
     </contquery>
    </contqueries>
   </project>
  </projects>
[
```

```
        <http-servers>
        ...
        </http-servers>
    ]
    [
        <esp-routers>
        ...
        </esp-routers>
    ]
</engine>
```

<engine> is a global wrapper for ESPE 400 that may include an engine name and a publish/subscribe port number as attributes for ESPE 400 such as in the form "engine name=nameString port=portNumber" . . . For illustration, <engine name='myanalysis' port='31417'> may be specified for an engine where 31417 specifies the pub/sub port for ESPE 400 named "myanalysis". Other parameters for <engine> may include zero or more http-servers and zero or more esp-routers, where <http-servers> is a container for HTTP server elements, and <esp-routers> is a container for ESP router elements.

The HTTP server elements may include administrative servers indicated, for example, by "http-admin-server" or pub/sub servers indicated, for example, by "http-pubsub-server". For illustration,

```
<http-servers>
    <http-admin-server port='46001'/>
    <http-pubsub-server port='46002'/>
</http-servers>
``` specifies an administrative server with port number 46001 and a pub/sub server with port number 46002. The administrative server port number defines the port through which the XML server (e.g., manager engine 722, remote engine A 722a) receives HTTP requests. For example, the port number that remote engine A 722a receives HTTP requests from manager engine 722. The pub/sub server port number defines the port through which ESPE A 400a receives event block objects from ESPE manager 400m. Security information as needed may be defined to provide access through the ports.

An ESP router is a mechanism used to integrate ESPE manager 400m with ESPE A 400a. The ESP router adds an XML configuration layer over the ESP C++ pub/sub API to accomplish this integration. The ESP router configuration can be embedded in the XML server model configuration directly beneath the <engine> element as shown above, which embeds the ESP router element(s) directly into ESPE manager 400m. Alternatively, the ESP router configuration can be defined in a model by itself to run an XML server that acts solely as an ESP router using the pub/sub API. Router engine 724 can be dynamically managed through the ESP representational state transfer (REST) API.

An illustrative XML file schema for an ESP router configuration is shown below for the container for ESP router elements, where "element" defines an XML element, "attribute" defines an XML attribute, "name= . . . " defines a substitution rule, a root node uses a "start=" specification, "?" indicates optional, "*" indicates zero or more, "+" indicates one or more:

```
start =
(
    element engine {
        attribute name { name_t }?,
        element http-servers {
            element http-admin-server {
                attribute port { xsd:unsignedShort },
                ssl_t?
            }? &
            element http-pubsub-server {
                attribute port { xsd:unsignedShort },
                ssl_t?
            }?
        }?,
        attribute port { xsd:unsignedShort }?,
        router_t?
    }
)
```

The "name" attribute provides a name of the router engine such as a name of router engine 724. The "http-servers" element specifies an administrative server ("http-admin-server") with a "port" attribute that defines the port number for the administrative server and with an optional secure sockets layer (SSL) element "ssl_t" and a pub/sub server ("http-pubsub-server") with a "port" attribute that defines the port number for the pub/sub server and with an optional SSL element "ssl_t". The "port" attribute defines a port number for router engine 724. The "router t" parameter is a container element for one or more ESP router elements.

The illustrative XML file schema may further include definitions for regular expression for schema/output names that may be defined based on:

```
name_t = ( xsd:string { pattern="[\i][\i\d]*" } )
int_t = ( xsd:string { pattern="[\d]*" } )
```

The illustrative XML file schema may further include a definition for the optional SSL elements that may be defined based on:

```
ssl_t = element ssl {
    element certificate { xsd:string },
    element passphrase { xsd:string }
}
```

The illustrative XML file may further include a definition for an engine instance specification that may be defined based on:

```
esp_engine_t = element esp-engine {
    attribute name { name_t },
    attribute host { string },
    attribute port { xsd:unsignedShort },
    attribute ha_port { xsd:unsignedShort }
}
``` where the "name" attribute is a name of ESPE A 400a, the "host" attribute is a host name of the device executing ESPE A 400a, the "port" attribute is a port number for pub/sub to the device executing ESPE A 400a, and the "ha_port" attribute is a port number to the administrative server of the device executing ESPE A 400a. For example, HTTP requests are sent using the "ha_port" attribute; whereas, published events are sent using the "port" attribute.

The illustrative XML file schema may further include a definition for time parameters that may be defined based on:

```
time_units = (
    xsd:string {pattern='microseconds?'}
    | xsd:string {pattern='milliseconds?'}
    | xsd:string {pattern='seconds?'}
    | xsd:string {pattern='minutes?'}
    | xsd:string {pattern='hours?'}
    | xsd:string {pattern='days?'}
)
time_vu_t = list { xsd:integer, time_units }
```

The illustrative XML file schema may further include a definition for opcodes that may be defined based on:
opcode_t=('insert' | 'update' | 'delete' | 'upsert' | 'safedelete')

The illustrative XML file schema may further include a definition for each router element that may be defined based on:

```
router_t = element esp-routers {
    attribute ping-interval { xsd:unsignedShort }?,
    element esp-router {
        attribute name { name_t },
        attribute primary-retries { xsd:unsignedShort }?
        attribute secondary-retry-interval { time_vu_t }?,
        attribute output-stats-interval { xsd:unsignedShort }?,
```

The "ping-interval" attribute defines how often the router element pings ESPE A 400a to confirm ESPE A 400a has not failed. The "esp-router" element defines the components of the router element such as router engine 724. The "name" attribute defines the name for the router instance. The "primary-retries" attribute defines how many times ping attempts are performed after ESPE A 400a has failed before a slower retry interval defined by the "secondary-retry-interval" attribute is used when attempting to reconnect to the failed ESPE A 400a. For example, if the "primary-retries" attribute is specified as ten, after ten attempts to reconnect, the "secondary-retry-interval" attribute is used to define the time interval for subsequent reconnection attempts since the failed ESPE A 400a may be down awhile so the time interval between attempts to reconnect can be increased. The "output-stats-interval" attribute specifies how frequently to output statistics related to execution of the router element.

The illustrative XML file schema may further include a definition for each ESPE A 400a element that may be defined based on:

```
element esp-engines {
    element esp-engine {
        attribute name { name_t },
        attribute host { xsd:string },
        attribute port { xsd:unsignedShort },
        element auth-token { text }?,
        element auth-token-url { text }?
    }+
}+,
```

The "esp-engines" element is a container for ESPE A 400a. The "esp-engine" element encapsulates ESPE A 400a. The "name" attribute defines the name for ESPE A 400a. The "host" attribute defines the port for ESPE A 400a. The "port" attribute defines the port number for ESPE A 400a. The "auth-token" element defines an authentication token for connecting to ESPE A 400a. The "auth-token-url" element defines an authentication token URL for connecting to ESPE A 400a.

The illustrative XML file schema may further include a definition for each destination ESPE A 400a that may be defined based on:

```
element esp-destinations {
    element publish-destination {
        attribute name { name_t },
        attribute opcode { opcode_t }?,
        element filter-func { xsd:string [code] }?,
        element publish-target {
            element engine-func { xsd:string [code] },
            element project-func { xsd:string [code] },
            element contquery-func { xsd:string [code] },
            element window-func { xsd:string [code] }
        },
        element event-fields {
            element init {
                element value {
                    attribute name { name_t [code] },
                    xsd:string
                }+
            }?,
            element fields {
                element field {
                    attribute name { name_t [code] },
                    xsd:string
                }+
            }?
        }+,
        element writer-destination {
            attribute name { name_t },
            attribute format { 'xml' | 'json' | 'csv' },
            attribute dateformat { xsd:string }?,
            element file-func { xsd:string [code] }
        }+
    },
```

The "esp-destinations" element is a container for source windows to which the router element may publish. The "publish-destination" element encapsulates a source window definition to which the router element is publishing including a name for the destination, an opcode for the event block object, a filter function to determine whether or not to publish the event block object to the source window, and the project, continuous query, and source window names. The "engine-func" element defines a function used to resolve the target ESPE A 400a and must resolve to match a value of a "name" of one of the ESPE A 400a defined in the <esp-engine> element. The "project-func" element defines a function used to resolve the target project of ESPE A 400a and must resolve to match a value of a name of a project in the resolved engine. The "contquery-func" element defines a function used to resolve the target continuous query of the project of ESPE A 400a and must resolve to match a value of a name of a continuous query in the resolved project. The "window-func" element defines a function used to resolve the target source window of the continuous query of the project of ESPE A 400a and must resolve to match a value of a name of a source window in the resolved continuous query. The "event-fields" element is a container that holds functions that support the augmentation of the event block object by adding new fields or modifying fields.

The "writer-destination" element defines a file sink. Instead of publishing events to a fully qualified source window using the "publish-destination" element, the event block objects can be written to a computer-readable medium with the name of the destination, the specified format and date format. The "file-func" element defines a function used to resolve the name of the file into which the event block objects are written, which includes writing to the console.

Using the "file-func" element, a "writer-destination" element can generate an output filename from the content of the event block object.

The illustrative XML file schema may further include a definition for each route that may be defined based on:

```
element esp-routes {
    element esp-route {
        attribute name { name_t },
        attribute to { name_t },
        attribute snapshot { xsd:boolean }?,
        element engine-expr { xsd:string [regex] }?,
        element project-expr { xsd:string [regex] }?,
        element contquery-expr { xsd:string [regex] }?,
        element window-expr { xsd:string [regex] }?,
        element type-expr { xsd:string [regex] }?,
    }+
    }
  }
}
```

The "esp-routes" element is a container of routes. The "esp-routes" element describes a route that consists of subscription information along with destinations to which the received event block objects are sent. Regular expressions may be used to specify the windows to which the route subscribes. Regular expressions can be specified for each level of the hierarchy (engine name using "engine-expr", project name using "project-expr", continuous query name using "contquery-expr", window name using "window-expr", and window type using "type-expr"). Expressions are optional. For any level for which an expression is not specified, the route uses all available instances of that entity. Thus, when expressions are not specified, the route subscribes to all windows in all continuous queries in all projects in all engines.

The "esp-route" element defines the route. The "name" attribute defines a name for the route. The "to" attribute defines a comma separated list of destination elements that match a name value for a "publish-destination" element or a "writer-destination" element. The "engine-expr", "project-expr", "contquery-expr", and "window-expr" elements define one or more windows of ESPE manager 400m from which router engine 724 receives event blocks objects because router engine 724 has subscribed to the window. The "type-expr" element defines the type of each window such as source, filter, join, etc. The "snapshot" attribute indicates whether or not the event block objects include a state snapshot. For example, router configuration file 720, described further below, is created to instantiate router engine 724 in a model by itself based on the XML schema above for <esp-routers>.

Returning to the XML syntax for remote ESP model 716, <projects> may be a container for a list of one or more project elements of the one or more projects 402 defined by ESPE A 400a. <project> defines a project of the one or more projects 402 by identifying execution and connectivity attributes and a list of the one or more continuous queries 404 of each project to execute of the one or more projects 402. <project> may include a project name attribute, a thread attribute, a pub/sub mode attribute, a pub/sub port number attribute, etc. The thread attribute defines a thread pool size. The pub/sub mode attribute options may include "none", "auto", and "manual". When "auto" or manual is specified, the pub/sub port number attribute specifies the port number. For illustration, <project name='analysis' threads='16' pubsub='manual' port='31417'> may be specified for a project.

<contqueries> may be a container for a list of one or more continuous query elements of the one or more continuous queries 404. Each <contquery> defines a continuous query of the one or more continuous queries 404 of the project and includes windows and edges. <contquery> may include a continuous query name attribute, a window attribute, etc.

<windows> is a container of one or more window-type elements. Illustrative window-type elements may include "aggregate", "compute", "copy", "counter", "filter", "functional", "join", "notification", "pattern", "procedural", "source", "textCategory", "textContext", "textSentiment", "union", etc. For illustration, the following may specify window type elements:

```
<windows>
    <window-source name='factInput' ...</window-source>
    <window-source name='dimensionInput' ...</window-source>
    <window-join name='joinedInput' ...</window-join>
    <window-union name='unionedInput' ...</window- union >
</windows>
```

Each window-type may include a window type name attribute, a pub/sub mode for the window type as well as other attributes based on the window-type. The following is a list of window types:

A "source" type window specifies a source window of a continuous query. Event streams enter continuous queries by being published or injected into a source window.

A "compute" type window defines a compute window, which enables a one-to-one transformation of input events into output events through the computational manipulation of the input event stream fields.

A "copy" type window makes a copy of a parent window, which can be useful to set new event state retention policies. Retention policies can be set in source and copy windows, and events may be deleted when a windows retention policy is exceeded.

An "aggregate" type window is similar to a compute window in that non-key fields are computed. An aggregate window uses a key field or fields for a group-by condition. Unique key field combinations form their own group within the aggregate window such that events with the same key combination are part of the same group.

A "counter" type window counts events streaming through to monitor a number and a rate at events are being processed.

A "filter" type window specifies a window with a registered Boolean filter function or expression that determines which input events are allowed into the filter window.

A "functional" type window specifies different types of functions to manipulate or transform the data in events. Fields in a functional window can be hierarchical, which can be useful for applications such as web analytics.

A "join" type window takes two input windows and a join type. A join window supports equijoins that are one to many, many to one, or many to many. Both inner and outer joins may be supported.

A "notification" type window sends notifications through email, text, or multimedia message. Any number of delivery channels can be specified to send the notifications. A notification window uses the same underlying language and functions as the functional window.

A "pattern" type window enables the detection of events of interest. A pattern defined in this window type is an expression that logically connects declared events of interest. For example, to define a "pattern" window, events of interest are defined and connected using operators such as "AND", "OR", "FBY", "NOT", "NOTOCCUR", and "IS". The operators can accept optional temporal conditions.

A "procedural" type window enables specification of an arbitrary number of input windows and input-handler functions for each input window (that is, event stream).

A "textCategory" window enables categorization of a text field in incoming events. The text field could generate zero or more categories with scores.

A "textContext" window enables abstraction of classified terms from an unstructured string field. This window type can be used to analyze a string field from an event's input to find classified terms. Events generated from those terms can be analyzed by other window types. For example, a pattern window could follow a "textContext" window to look for tweet patterns of interest.

A "textSentiment" window determines a sentiment of text in a specified incoming text field and a probability of its occurrence. A sentiment value is "positive," "neutral," or "negative." The probability is a value between 0 and 1.

A "union" window specifies a simple join that merges one or more streams with the same schema.

<edges> is a container of one or more edge elements. <edge> specifies a connectivity between two or more windows to define the directed graph flow of ESPE A 400a. <edge> may include a source name attribute and a target name attribute that each define a window name defined using a window-type name attribute. For illustration, the following may specify edges:

```
<edges>
    <edge source='wind001' target='win002'/>
    <edge source='wind002' target='win003'/>
    <edge source='wind003' target='win004 win005 win006'/>
    ...
</edges>
```

Manager application 712 may provide the REST API layer for a user to query for information described in manager configuration file 714, remote ESP model 716, manager ESP model 718, and router configuration file 720 and to query a status of ESPE manager 400m and/or of ESPE A 400a. For example, using the REST API, the user can create, delete, modify, and/or retrieve information related to the one or more projects 402, the one or more continuous queries 404, the one or more source windows 406, and/or the one or more derived windows 408 of ESPE manager 400m and/or of ESPE A 400a. The user can further start and stop a project of the one or more projects 402. The user still further may inject events into and retrieve events from ESPE manager 400m and/or of ESPE A 400a.

Manager application 712 provides a mapping of sources from edge devices (event publishing system 102) to ESPE A 400a of ESP cluster system 106 that may include cloud devices. By managing a mapping between connectors and ESPE A 400a, manager application 712 facilitates an elastic deployment of ESP in the cloud and makes large scale deployment easier. For example, manager application 712 supports deployment of SAS® Event Stream Processing as a service to a cloud platform that creates and manages hardware resources in the cloud.

ESPE A 400a may be provisioned on virtual machines of ESP cluster system 106. ESPE A 400a may each run remote engine 722a with their administrative and pub/sub ports open (also referred to as factory servers), for example, using a command such as "$DFESP_HOME/bin/dfesp_xml_server-pubsub 5575-http-pubsub 5577-http-admin 5576". ESPE A 400a can receive and respond to HTTP requests from ESPE manager 400m using the port number port specified for the "-http-admin" input parameter. A port for pub/sub commands to an HTTP server executing on ESP cluster system 106 is defined using the port number port specified for the "-http-pubsub" input parameter. In alternative embodiments, the port for admin commands and the port for pub/sub commands may use the same port. The "-http-admin" input parameter and the "-http-pubsub" input parameter are associated with HTTP server elements <http-servers>. A port for pub/sub commands to ESPE A 400a is defined using the port number port specified for the "-pubsub" input parameter. In alternative embodiments, the command line parameters may be defined by default, input by a user through a user interface, etc.

After provisioning ESPE A 400a as factory servers, manager application 712 can be controlled to:

deploy projects to ESPE A 400a through an administrative REST API to the HTTP server;

start one or more data sources of event publishing system 102 in an orchestrated fashion;

stream events for processing and analyzing through the pub/sub API of ESPE manager 400m; and dynamically add or remove ESPE A 400a of ESP cluster system 106.

Figure 8:
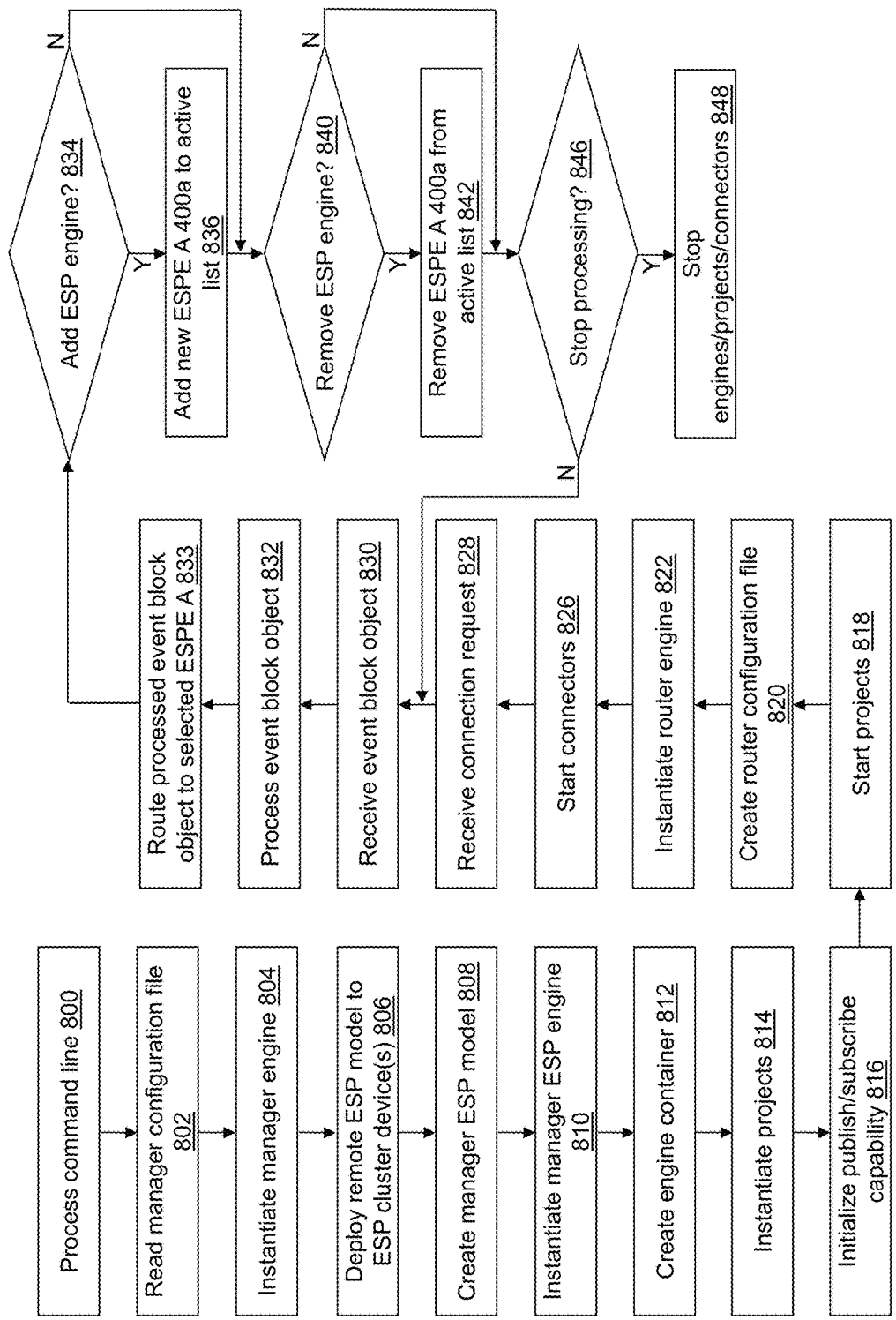
FIG. 8 depicts a flow diagram illustrating examples of operations performed by the cluster manager device of FIG. 7 in accordance with an illustrative embodiment.

Referring to FIG. 8, example operations associated with manager application 712 are described. Manager application 712 defines how incoming event streams from event publishing system 102 are transformed into meaningful outgoing event streams consumed by ESP cluster system 106 and ultimately event subscribing system 108. Additional, fewer, or different operations may be performed depending on the embodiment. The order of presentation of the operations of FIG. 8 is not intended to be limiting In an operation 800, a command line is processed. For illustration, to initiate execution of manager application 712, a user may execute the following command on Cluster manager device 104: "dfesp_am_server-http-admin port-pubsub port-adapter-manager modelfile <-auth><-output-projects file1><-output-routers file2>". Execution of the command starts an XML server on cluster manager device 104 and triggers execution of a binary file "dfesp_am_server" created by compiling manager application 712. Manager engine 722, instantiated by "dfesp_am_server", can receive and respond to HTTP requests from a user computing device using the port number port specified for the "-http-admin" input parameter. Manager engine 722 sends responses to the user computing device that may appear on a display of the user computing device and/or on a display of Cluster manager device 104. A name and a location of manager configuration file 714 are specified using the modelfile specified for the "-adapter-manager" input parameter. A port for pub/sub commands is defined using the port number port specified for the "-pubsub" input parameter. In alternative embodiments, the command line parameters may be defined by default, input by a user through a user interface, etc.

The optional "-auth" input parameter enables authentication of the user to Cluster manager device 104. The optional "-output-projects" input parameter triggers a write of manager ESP model 718 to file1 for manual execution on Cluster manager device 104 to instantiate ESPE manager 400*m*. The optional "-output-routers" input parameter triggers a write of router configuration file 720 to the file2 for manual execution on Cluster manager device 104 to instantiate router engine 724.

In an operation 802, manager configuration file 714 is read. For illustration, manager configuration file 714 may define an XML file that is parsed to define various parameters that are processed to dynamically control the operations performed by manager application 712 and to create manager ESP model 718 and router configuration file 720. An illustrative XML file schema is shown below where "element" defines an XML element, "attribute" defines an XML attribute, "name= . . . " defines a substitution rule, a root node uses a "start=" specification, "?" indicates optional, "*" indicates zero or more, "+" indicates one or more:

```
default namespace = ""
start =
(
    element engine {
        attribute name { name_t }?,
        description_t?,
        element http-servers {
            element http-admin-server {
                attribute port { xsd:unsignedShort },
                ssl_t?
            }? &
            element http-pubsub-server {
                attribute port { xsd:unsignedShort },
                ssl_t?
            }?
        }?,
        attribute port { xsd:unsignedShort }?,
        managers_t?
    }
)
```

The "name" attribute provides a name of manager engine 722. The "http-servers" element specifies an administrative server ("http-admin-server") with a "port" attribute that defines the port number for the administrative server and with an optional SSL element "ssl_t" and a pub/sub server ("http-pubsub-server") with a "port" attribute that defines the port number for the pub/sub server and with an optional SSL element "ssl_t". The "managers_t? parameter is a container element for one or more manager engine elements.

The illustrative XML file schema used to define manager configuration file 714 may further include definitions for regular expression for schema/output names that again may be defined based on:

```
name_t = ( xsd:string { pattern="[\i][\i\d]*" } )
int_t = ( xsd:string { pattern="[\d]*" } )
```

The illustrative XML file schema used to define manager configuration file 714 may further include definitions for the optional SSL elements that again may be defined based on:

```
ssl_t = element ssl {
    element certificate { xsd:string },
    element passphrase { xsd:string }
}
```

The illustrative XML file schema used to define manager configuration file 714 may further include definitions for an engine instance specification, such as for ESPE A 400*a*, that again may be defined based on:

```
esp_engine_t = element esp-engine {
    attribute name { name_t },
    attribute host { string },
    attribute port { xsd:unsignedShort },
    attribute ha_port { xsd:unsignedShort }
}
``` where the "name" attribute is a name of ESPE A 400*a*, the "host" attribute is a host name of the device executing ESPE A 400*a*, the "port" attribute is a port number for pub/sub to the device executing ESPE A 400*a*, and the "ha_port" attribute is a port number to the administrative server of the device executing ESPE A 400*a*. For example, HTTP requests are sent using the "ha_port" attribute; whereas, published events are sent using the "port" attribute.

The illustrative XML file schema used to define manager configuration file 714 may further include definitions for a property list of name/value pairs that may be defined based on:

```
properties_t =
    element properties {
        element property {
            attribute name { name_t },
            xsd:string
        }+
    }
```

The illustrative XML file schema used to define manager configuration file 714 may further include a definition for an embedded text comment that may be defined based on description_t=element description {text}.

The "managers_t" parameter of the engine is a top level container where manager ESP model 718 to be created and controlled by manager engine 722 are defined using the "esp-cluster-managers" element based on:

```
managers_t = element esp-cluster-managers {
    element esp-cluster-manager {
        attribute name { name_t },
        attribute output-stats-interval { int_t }?,
        element projects { ... },
        element raw-sources { ... },
        element esp-clusters { ... },
        element esp-maps { ... }
    }
}
```

The "name" attribute specifies a name for manager engine 722, the cluster manager instance. The "output-stats-interval" attribute specifies how frequently to output statistics related to execution of manager engine 722. The "projects" element specifies the one or more projects 402 executing on ESP cluster system 106 under control of manager engine 722. The "raw-sources" element defines event publishing sources of event publishing system 102 under control of manager engine 722. The "esp-clusters" element defines ESPE A 400*a* under control of manager engine 722. The "esp-maps" element defines a mapping between event publishing sources of event publishing system 102 and ESPE A 400*a*.

The one or more projects 402 may be defined in manager configuration file 714 based on:

```
element projects {
    element project {
        attribute name { name_t },
        attribute type { name_t },
        element project-url { xsd:string },
        element project-name { name_t }
    }*
}
```

The "project" element specifies a project of the one or more projects 402 of ESPE A 400a. The "name" attribute specifies a name of the project element instance. The "type" attribute specifies a type of the project element instance as reference or inline. The "project-url" attribute specifies a URL to the project definition. For example, the string defined for the "project-url" attribute specifies a name and a location of remote ESP model 716 that may be stored on third computer-readable medium 708, on ESP cluster system 106, or another device accessible by ESP cluster manager 104 using communication interface 706. The "project-name" attribute specifies a name of the project once the project is published to ESPE A 400a.

For illustration, a sample project element is shown below:

```
<projects>
    <project name='test' type='reference'>
        <project-url>file://broker.xml</project-url>
        <project-name>project</project-name>
    </project>
</projects>
```

The "raw-sources" element of the "esp-cluster-manager" element specifies one or more data sources of event publishing system 102 that may be defined in manager configuration file 714 based on:

```
element raw-sources {
    element raw-source {
        attribute name { name_t },
        attribute class { 'fs' | 'db'| 'kafka' | 'mq' | 'mqtt' | 'project' |
            'rmq' | 'smtp' | 'sniffer' | 'sol' | 'tdata' | 'tibrv'| 'tva' },
        properties_t
    }+
}
```

The "name" attribute specifies a name of the data source of event publishing system 102. The "class" attribute specifies a connector type of the data source of event publishing system 102. For illustration, "fs" indicates the data source is a file-socket, "kafka" indicates the data source is a message broker, "mq" indicates the data source is an IBM® WebSpheres MQ, "mqtt" indicates the data source is an mq telemetry transport server, "project" indicates the data source is an ESP project, "rmq" indicates the data source is a RabbitMQ message broker, "smtp" indicates the data source is a simple mail transport server, "sol" indicates the data source is a Solace Systems message broker, "tdata" indicates the data source is a TeraData high performance database, "tibrv" indicates the data source is a Tibco Rendezvous message bus, and "tva" indicates the data source is a Tervela messaging fabric. A fewer or a greater number of connector types may be used. The provided options are merely for illustration.

The "properties_t" element specifies a property list of name/value pairs based on the connector type of the data source specified by the "class" attribute. For example, the "properties_t" element when the "class" attribute is "fs" may include a "type" property name and value pair, an "fstype" property name and value pair, and an "fsname" property name and value pair. The "type" property specifies whether or not the data source is a publisher or a subscriber. Because the data source is event publishing device 200 of event publishing system 102, the "type" property is publish or "pub".

The "fstype" property may be selected from "binary", "csv", "xml", "json", "syslog", "hdat", "cef", etc. where "binary" indicates a binary formatted event, "csv" indicates a comma delimited data event, "xml" indicates an XML formatted event, "json" indicates an JavaScript object notation (JSON) formatted event, "syslog" indicates a system log event, "hdat" indicates an objective analysis package data event, "cef" indicates a common event formatted event. A fewer or a greater number of file-socket types may be used. The provided options are merely for illustration.

The "fsname" property indicates that the data source is either a file or a socket. For example, an "fsname" property value in the form of "host:port" indicates the data source is a socket. Otherwise, it is a file.

For illustration, four data sources of event publishing system 102 are defined below for illustration where each is of the file-socket type:

```
<raw-sources>
    <raw-source name='tradesSource' class='fs'>
        <properties>
            <property name='type'>pub</property>
            <property name='fstype'>csv</property>
            <property name='fsname'>trades.csv</property>
        </properties>
    </raw-source>
    <raw-source name='venuesSource' class='fs'>
        <properties>
            <property name='type'>pub</property>
            <property name='fstype'>csv</property>
            <property name='fsname'>venues.csv</property>
        </properties>
    </raw-source>
    <raw-source name='restrictedSource' class='fs'>
        <properties>
            <property name='type'>pub</property>
            <property name='fstype'>csv</property>
            <property name='fsname'>restricted.csv</property>
        </properties>
    </raw-source>
    <raw-source name='brokersSource' class='fs'>
        <properties>
            <property name='type'>pub</property>
            <property name='fstype'>csv</property>
            <property name='fsname'>brokers.csv</property>
        </properties>
    </raw-source>
</raw-sources>
```

The "esp-clusters" element of the "esp-cluster-manager" element specifies a list of ESPE A 400a under control of manager engine 722 and defined in manager configuration file 714 based on:

```
element esp-clusters {
    element esp-cluster {
        attribute name { name_t },
        attribute redundancy { xsd:unsignedShort }?,
        element esp-engines { esp_engine_t* },
        element spare-esp-engines { esp_engine_t* }?
    }+
}
```

The "name" attribute specifies a name of ESP cluster system 106. The "redundancy" attribute specifies whether or not ESP cluster system 106 supports one or more redundant ESPE for failover processing when one of remote ESPE A 400a of ESP cluster system 106 fails. The "esp-engines" element specifies a pointer to an engine instance specification for each remote ESPE A 400a. The "spare-esp-engines" element specifies a pointer to an engine instance specification for each spare ESPE A 400a that can be controlled when needed. For example, manager engine 722 can start or stop a spare ESPE A 400a based on a rate of event stream flow. For example, a record of a rate of event stream flow to each remote ESPE A 400a may be stored and monitored. If the rate to a remote ESPE A 400a is below a predefined threshold, manager engine 722 can automatically replace it with a spare remote ESPE A 400a.

For illustration, three remote ESPE A 400a are defined for ESP cluster system 106 as shown in the illustration below:

```
<esp-clusters>
  <esp-cluster name='openstack'>
    <esp-engines>
      <esp-engine name='esp1' host='10.37.24.3' port='31415'
        ha_port='31414'/>
      <esp-engine name='esp2' host='10.37.24.3' port='31417'
        ha_port='31416'/>
      <esp-engine name='esp3' host='10.37.24.3' port='31419'
        ha_port='31418'/>
    </esp-engines>
  </esp-cluster>
</esp-clusters>
```

The "esp-maps" element of the "esp-cluster-manager" element defines how event publishing sources defined by the <raw-sources> element, such as event publishing device 200 of event publishing system 102, are mapped to the one or more source windows 406 of a project of the one or more projects 402 of ESPE A 400a. The "esp-maps" element may be defined in manager configuration file 714 based on:

```
element esp-maps {
  element esp-map {
    attribute name { name_t },
    attribute cluster-ref { name_t },
    attribute model-ref { name_t },
    element map { ... }+
    element orchestration { ... }?
  }+
}
```

The "name" attribute specifies a name of the ESP cluster map. The "cluster-ref" attribute specifies a name of the ESP cluster that matches a "name" attribute field specified for an "esp-cluster" element. The "model-ref" attribute specifies a name of the ESP project that matches a "name" attribute field specified for a "project" element. The "map" element maps the source to the ESPE source window of ESPE A 400a. The "orchestration" element defines an order for starting connectors between data sources and ESPE manager 400m.

The "map" element of the "esp-map" element may be defined in manager configuration file 714 based on:

```
element map {
  attribute name { name_t },
  element from { attribute source { name_t } },
  element multicast-destination { ... }*,
  element roundrobin-destination { ... }*,
  element hash-destination { ... }*,
}+
```

The "name" attribute specifies a name of the map. The "from" element specifies a name of the data source that matches a "name" attribute field specified for a "raw-source" element. One of "multicast-destination", "roundrobin-destination", or "hash-destination" is used to define how a specific ESPE A 400a of ESP cluster system 106 is selected as a recipient of an event block object from the data source. Selection of "multicast-destination" indicates that the event is sent to each ESPE A 400a. For illustration, the "multicast-destination" element of the "map" element may be defined based on:

```
element multicast-destination {
  attribute name { name_t },
  attribute opcode { 'insert' | 'upsert' | 'update' | 'delete' }?,
  element publish-target {
    element project-func { xsd:string [code] },
    element contquery-func { xsd:string [code] },
    element window-func { xsd:string [code] }
  }
}
```

The "name" attribute specifies a name of the multicast destination. The "opcode" attribute specifies the opcode for the event block object streamed to ESPE A 400a. The "publish-target" element defines the source window target of ESPE A 400a. The "publish-target" element includes a specification of a project of the one or more projects 402 using the "project-func" element, a continuous query of the one or more continuous queries 404 using the "contquery-func" element, and a source window of the one or more source window 406 using the "window-func" element. The "project-func" element defines a function used to resolve the target project of ESPE A 400a and must resolve to match a value of a name of a project in the resolved ESPE A 400a. The "contquery-func" element defines a function used to resolve the target continuous query of the project of ESPE A 400a and must resolve to match a value of a name of a continuous query in the resolved project. The "window-func" element defines a function used to resolve the target source window of the continuous query of the project of ESPE A 400a and must resolve to match a value of a name of a source window in the resolved continuous query. Thus, the "publish-target" element defines a source window of ESPE A 400a to which the event block object is published.

Selection of "roundrobin-destination" indicates that the event is streamed to one ESPE A 400a, where the ESPE A 400a is selected in turn. For illustration, the first event block is streamed to a first ESPE A1 400a1; a second event block is streamed to a second ESPE A2 400a2; a third event block is streamed to a third ESPE A3 400a3; and so on based on a number of ESPE A 400a defined using the <esp-engines> element, eventually wrapping around to the first ESPE A 400a again and repeating the sequence. For illustration, the "roundrobin-destination" element of the "map" element may be defined based on:

```
element roundrobin-destination {
  attribute name { name_t },
  attribute opcode { 'insert' | 'upsert' | 'update' | 'delete' }?,
```

```
element publish-target {
  element project-func { xsd:string [code]},
  element contquery-func { xsd:string [code]},
  element window-func { xsd:string [code]}
  }
}
```

The "name" attribute specifies a name of the multicast destination. The "opcode" attribute specifies the opcode for the event block object streamed to ESPE A 400a. The "publish-target" element includes a specification of a project of the one or more projects 402 using the "project-func" element, a continuous query of the one or more continuous queries 404 using the "contquery-func" element, and a source window of the one or more source window 406 using the "window-func" element. The "project-func" element defines a function used to resolve the target project of ESPE A 400a and must resolve to match a value of a name of a project in the resolved ESPE A 400a. The "contquery-func" element defines a function used to resolve the target continuous query of the project of remote ESPE A 400a and must resolve to match a value of a name of a continuous query in the resolved project. The "window-func" element defines a function used to resolve the target source window of the continuous query of the project of remote ESPE A 400a and must resolve to match a value of a name of a source window in the resolved continuous query. Thus, the "publish-target" element defines a source window of remote ESPE A 400a to which the event block object is published.

Selection of "hash-destination" indicates that the event is streamed to one remote ESPE A 400a, where the remote ESPE A 400a is selected based on a hash value computed from a specified field in the event block object. The hash value is an integer between zero and the number of ESPE A 400a minus one. For example, the field value of the specified field may be converted to an integer, divided by the number of remote ESPE A 400a, and a remainder of the division used as the hash value. The hash value computed from a value of the specified field of the event block object is used to determine to which ESPE A 400a the event block object is sent. Various hash functions may be used. For example, the hash function may be a plug-in to facilitate easy replacement of the hash function used with the specified hash value. For illustration, the "hash-destination" element of the "map" element may be defined based on:

```
element hash-destination {
  attribute name { name_t },
  attribute durable { xsd:boolean }?,
  attribute opcode { 'insert' | 'upsert' | 'update' | 'delete' }?,
  element publish-target {
    element project-func { xsd:string [code]},
    element contquery-func { xsd:string [code]},
    element window-func { xsd:string [code]}
  },
  element fields {
    element field { attribute name { name_t } }+
  }?
}
```

The "name" attribute specifies a name of the hash destination. The "durable" attribute specifies whether or not the hash is durable. When the "durable" attribute indicates the hash is durable, the streamed event block object can be split when a new remote ESPE A 400a of the spare remote ESPE A 400a is added. When a spare remote ESPE A 400a is added, it will be the recipient of a subspace of the hash values that is previously owned by another remote ESPE A 400a. In other words, another remote ESPE A 400a that is previously the recipient of a set of hash values delegates a subset of the set of hash values to the new remote ESPE A 400a as the new recipient. Other remote ESPE A 400a are not affected by the addition of the new remote ESPE A 400a.

The "opcode" attribute specifies the opcode for the event block object streamed to ESPE A 400a. The "publish-target" element includes a specification of a project of the one or more projects 402 using the "project-func" element, a continuous query of the one or more continuous queries 404 using the "contquery-func" element, and a source window of the one or more source window 406 using the "window-func" element. The "project-func" element defines a function used to resolve the target project of ESPE A 400a and must resolve to match a value of a name of a project in the resolved ESPE A 400a. The "contquery-func" element defines a function used to resolve the target continuous query of the project of ESPE A 400a and must resolve to match a value of a name of a continuous query in the resolved project. The "window-func" element defines a function used to resolve the target source window of the continuous query of the project of ESPE A 400a and must resolve to match a value of a name of a source window in the resolved continuous query. Thus, the "publish-target" element defines a source window of ESPE A 400a to which the event block object is published. The "fields" element includes one or more "field" elements that each define a field "name" of a field in the event block object on which the selection of ESPE A 400a is based. The "fields" element defines functions (as in a functional window) that can be used to modify the event block object that is going to be published.

The "orchestration" element of the "esp-map" element defines an order in which connectors between event publishing sources defined by the <raw-sources> element and ESPE manager 400m are started. To stream data into ESPE manager 400m, a connector is used. Connectors use the pub/sub API to interface with a variety of communication fabrics, drivers, and clients. Connectors are C++ classes that are instantiated in the same process space as ESPE manager 400m. By default, connectors may be started automatically when a project of the one or more projects 402 of ESPE manager 400m is started so that the connectors and project run concurrently.

Connector orchestration defines the order in which connectors within the project execute, depending on the state of another connector when all connectors are not started simultaneously. Connector orchestration can be useful to load reference data, inject bulk data into a window before injecting streaming data, or when join windows are used. Connector orchestration can be defined as a directed graph similar to the representation of a continuous query. For example, the "orchestration" element may be defined in manager configuration file 714 based on:

```
element orchestration {
  element connector-groups {
    element connector-group {
      attribute name { name_t },
      element connector-entry {
        attribute connector {name_t },
        attribute state { "finished" | "running" | "stopped" }
      }+
    }+
  },
```

```
    element edges {
      element edge {
        attribute source { name_t },
        attribute target { name_t }
      }+
    }
  }?
```

The "connector-groups" element is a container for one or more connectors. Each connector is defined using the "connector-group" element, where the "name" attribute of the "connector-group" element specifies a name of the data source that matches a "name" attribute field specified for a "raw-source" element. The "connector-group" element specifies one or more connectors that are started simultaneously. The "connector-entry" attribute of the "connector-group" element includes a "connector" attribute and a "state" attribute. The "connector" attribute specifies a name of the connector. The "state" attribute represents the state reached by the associated connector as specified by the "connector" attribute before the next group specified by the "connector-groups" element is started. Optional values for the "state" attribute may include "finished", "started", and "running". Selection of "finished" for the "state" attribute indicates that the connector has finished processing as in the connector has stopped. For example, data used for initialization has been published to ESPE A 400a. Selection of "started" for the "state" attribute indicates that the connector has been successfully started. Selection of "running" for the "state" attribute indicates that the connector is receiving event block objects from the associated data source.

Manager engine 722 provides connector orchestration. When a connector updates its state, it also updates its state in any connector groups it belongs to, which may update the aggregate group state as well. Manager engine 722 monitors all connector group states and starts new connectors as needed. The connectors belong to different groups, and manager engine 722 keeps track of the states of the different groups and makes sure the order defined by the "edges" element are obeyed.

The "edges" element is a container of one or more edges of the directed graph. The "edge" element represents which connector groups control start of another connector group. The "source" attribute of the "edge" element includes a name of the connector group that matches a "name" attribute field specified for a "connector-group" element. The "target" attribute of the "edge" element includes a name of the connector group that matches a "name" attribute field specified for a different "connector-group" element that is started after the state of each connector of the connector group specified by the "source" attribute is reached. For connector execution to be dependent on the state of another connector, each connector is defined in a different "connector-group" element. Groups can contain multiple connectors, and dependencies are defined in terms of the group, not the individual connectors.

For illustration, an ESP map is show below:

```
<esp-map name='esp-map1' cluster-ref='openstack' model-ref='test'>
  <map name='venuesMap'>
    <from source='venuesSource'/>
    <multicast-destination name='dest2' opcode='insert'>
      <publish-target>
        <project-func>project</project-func>
        <contquery-func>query</contquery-func>
        <window-func>venuesInput</window-func>
      </publish-target></multicast-destination>
  </map>
  <map name='brokersMap'>
    <from source='brokersSource'/>
    <multicast-destination name='dest2' opcode='insert'>
      <publish-target>
        <project-func>project</project-func>
        <contquery-func>query</contquery-func>
        <window-func>brokersInput</window-func>
      </publish-target></multicast-destination>
  </map>
  <map name='restrictedMap'>
    <from source='restrictedSource'/>
    <multicast-destination name='dest3' opcode='insert'>
      <publish-target>
        <project-func>project</project-func>
        <contquery-func>query</contquery-func>
        <window-func>restrictedInput</window-func>
      </publish-target>
    </multicast-destination>
  </map>
  <map name='tradesMap'>
    <from source='tradesSource'/>
    <hash-destination name='dest4' opcode='insert'>
      <publish-target>
        <project-func>project</project-func>
        <contquery-func>query</contquery-func>
        <window-func>tradesInput</window-func>
      </publish-target>
      <fields>
        <field name='broker'/>
      </fields>
    </hash-destination>
  </map>
  <orchestration>
    <connector-groups>
      <connector-group name='G1'>
        <connector-entry connector='venuesSource' state='finished'/>
        <connector-entry connector='restrictedSource' state='finished'/>
        <connector-entry connector='brokersSource' state='finished'/>
      </connector-group>
      <connector-group name='G2'>
        <connector-entry connector='tradesSource' state='finished'/>
      </connector-group>
    </connector-groups>
    <edges>
      <edge source='G1' target='G2'/>
    </edges>
  </orchestration>
</esp-map>
```

In an operation 804, manager engine 722 is instantiated based on the "start=engine" definition read from manager configuration file 714.

In an operation 806, the remote ESP model 716 defined by the "project-url" attribute of the "project" element in manager configuration file 714 is deployed to each ESPE A 400a listed under the "esp-cluster" element including the spare ESPE 400a. The deployment of remote ESP model 716 may be accomplished using an administrative REST interface of remote engine A 722a running on each computing device of ESP cluster system 106. A command line utility "dfesp_xml_client" can be used to communicate with remote engine A 722a using the HTTP protocol. For example, GET, POST, PUT, and DELETE requests can be sent. GET requests may be sent by default. The client may support communication with remote engine A 722a over a secure HTTP channel using HTTPS. A list of active ESPE A 400a may be initialized with pointers to each ESPE A 400a included in the "esp-engines" element of manager configuration file 714.

To send HTTP requests to remote engine A 722a, the following command structure can be used: "dfesp_xml_client-url URL Value <-headers headers Value><-cert certificate Value><-pass passphraseValue><-auth-token token><-auth-token-url tokenURLValue><-post<postURLValue>><-put <putURLValue>><-head><-delete><-showheaders>", where URL Value specifies the URL to which to send an HTTP request, headers Value specifies a comma-separated list of colon-separated name-value pairs that specify headers to URL requests, certificate Value specifies a certificate file to which to refer when using HTTPS, passphraseValue specifies an SSL passphrase for HTTP, token specifies an OAuth authentication token to be used when communicating with a server using authentication, tokenURLValue specifies a URL from which to get an OAuth authentication token, postURLValue specifies a URL to which send a POST request, and putURLValue specifies a URL to which send a PUT request. "-head" specifies that an HTTP HEAD request is sent. "-delete" specifies that an HTTP DELETE request is sent. "-showheaders" specifies an HTTP request to return and display HTTP response headers.

For illustration, the following command "dfesp_xml_client-url 'http://host:ha_port/SASESP/projects/project'-put 'file://model'" may be issued to each ESPE A 400a listed in the "esp-engines" element of the "esp-cluster" element by manager engine 722. In response, an HTTP PUT request is sent to each ESPE A 400a.

The model provided on the command line is the "project-url" attribute of the "project" element in manager configuration file 714. The "project-url" may be appended to file:// to indicate it is a file. The host provided on the command line is the "host" attribute of the associated "esp_engine" defined for the "esp-cluster" element in manager configuration file 714. The ha_port provided on the command line is the "ha_port" attribute of the associated "esp_engine" defined for the "esp-cluster" element in manager configuration file 714.

Figure 9:
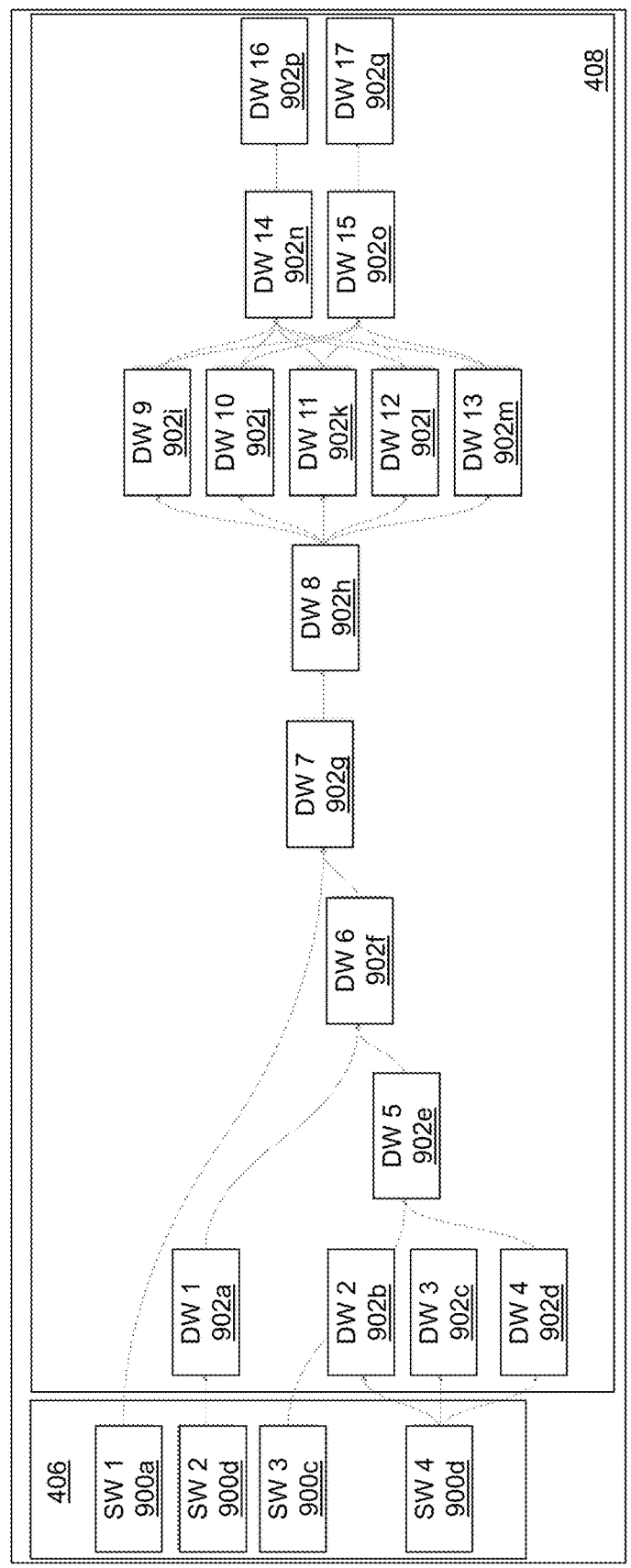
FIG. 9 depicts a directed graph of windows for event stream manipulation and transformation performed by an ESP cluster system of the stream processing system of FIG. 1 in accordance with an illustrative embodiment.

Remote ESP model 716 includes a definition of an ESP model to execute at the one or more computing devices of ESP cluster system 106 using ESPE A 400a. For illustration, remote ESP model 716 may be an XML file that is parsed. Referring to FIG. 9, a block diagram of remote ESP model 716 is shown in accordance with an illustrative embodiment with an overview of sample XML included in remote ESP model 716 summarized below that implements a trade violation detection model (the full XML example is shown in Appendix A for illustration):

```
<engine>
 <projects>
  <project name='project' pubsub='auto' threads='10'>
   <contqueries>
    <contquery name='query' trace='counter'>
     <windows>
      <window-source name='tradesInput' insert-only='true' index='pi_EMPTY'>
       <schema>
        <fields> <field name='id' type='int64' key='true'/> ... </fields>
       </schema>
      </window-source>
      <window-source name='brokersInput' insert-only='true' index='pi_EMPTY'>
       ...
      <window-source name='venuesInput' insert-only='true' index='pi_EMPTY'>
       ...
      <window-source name='restrictedInput' insert-only='true' index='pi_EMPTY'>
       ...
      <window-join name='addBrokerData' index='pi_EMPTY'>
       <join type='inner' no-regenerates='true'>
        <conditions> <fields left='broker' right='broker'/> </conditions>
       </join>
       <output>
        <field-selection name='broker' source='l_broker'></field-selection>
        ...
       </output>
      </window-join>
      <window-join name='addVenueData' index='pi_EMPTY'>...
      <window-join name='addRestrictedData' index='pi_EMPTY'>...
      <window-functional name='transform' index='pi_EMPTY'>
       <schema><fields><field name='id' type='int64' key='true'/> ...
    </fields></schema>
       <function-context>
        <functions>
         <function name='tradeSeconds'>timeSecondOfDay($time)</function> ...
        </functions>
       </function-context>
      </window-functional>
      <window-functional name='venueData' index='pi_EMPTY'> ...
      <window-filter name='largeTrades' index='pi_EMPTY'>
       <expression><![CDATA[quant>=1000]]></expression> </window-filter>
      <window-filter name='restrictedTrades' index='pi_EMPTY'> ...
      <window-filter name='openMarking' index='pi_EMPTY'> ...
      <window-filter name='closeMarking' index='pi_EMPTY'> ...
      <window-functional name='brokerAlerts' index='pi_EMPTY'> ...
      <window-functional name='violations' index='pi_EMPTY'> ...
      <window-aggregate name='brokerAlertsAggr' index='pi_HASH'
       pubsub='true'>
       <schema><fields><field name='brokerName' type='string'
         key='true'/>... </fields></schema>
       <output><field-expr>ESP_aSum(frontRunningBuy)</field-expr> ...</output>
      </window-aggregate>
      <window-pattern name='frontRunningBuy' index='pi_EMPTY'>
```

```
        <schema><fields><field name='id' type='int64'
          key='true'/>...</fields></schema>
        <patterns>
          <pattern index='broker,symbol'>
            <events>
              <event name='e1' source='transform'>
                ((buysellflg == 1) and (broker == buyer) and (s == symbol) and
                (b == broker) and (p == price))
              </event>
              <event name='e2' source='transform'>...
              <event name='e3' source='transform'>...
            </events>
            <logic>fby{1 hour}(fby{1 hour}(e1,e2),e3)</logic>
            <output><field-selection name='broker' node='e1'/>...</output>
            <timefields><timefield field='tradeTime' source='transform'/></timefields>
          </pattern>
        </patterns>
      </window-pattern>
      <window-pattern name='frontRunningSell' index='pi_EMPTY'>...
      <window-aggregate name='violationCounts' index='pi_HASH'>...
      <window-counter name='counter' count-interval='2 seconds' clear-interval='30
        seconds' index='pi_EMPTY'/>
      <window-counter name='rate' count-interval='1 seconds' ...</windows>
      <edges>
        <edge source='tradesInput' target='largeTrades counter'/>
        <edge source='tradesInput' target='rate'/>
        <edge source='largeTrades brokersInput' target='addBrokerData'/>
        <edge source='addBrokerData venueData' target='addVenueData'/>
        ...
      </edges>
    </contquery>
  </contqueries>
 </project>
</projects>
</engine>
```

Referring to FIG. 9, a graphical representation of the XML model captured in the sample remote ESP model 716 is shown. The graphical model indicates that the one or more source windows 406 include a source window (SW) 1 900a for illustration named "restrictedInput", a SW 2 900b for illustration named "venuesInput", a SW 3 900c for illustration named "brokersInput", and a SW 4 900d for illustration named "tradesInput". SW 2 900b provides input to a derived window (DW) 1 902a for illustration named "venueData". SW 3 900c provides input to a DW 2 902b for illustration named "rate". SW 4 900d provides input to DW 2 902b, to DW 3 902c for illustration named "counter", and to DW 4 902d for illustration named "largeTrades". DW 2 902b, DW 3 902c, and DW 4 902d provide input to a DW 5 902e for illustration named "addBrokerData". DW 1 902a and DW 5 902e provide input to a DW 6 902f for illustration named "addVenueData". SW 1 900a and DW 6 902f provide input to a DW 7 902g for illustration named "addRestrictedData". DW 7 902g provides input to a DW 8 902h for illustration named "transform". DW 8 902h provides input to a DW 9 902i for illustration named "frontRunningSell", to a DW 10 902j for illustration named "frontRunningBuy", to a DW 11 902k for illustration named "closeMarking", to a DW 12 902l for illustration named "openMarking", and to a DW 13 902m for illustration named "restrictedTrade". DW 9 902i, DW 10 902j, DW 11 902k, DW 12 902l, and DW 13 902m provide input to a DW 14 902n for illustration named "violations" and to a DW 15 902o for illustration named "brokerAlerts". DW 14 902n provides input to a DW 16 902p for illustration named "violationCounts". DW 15 902o provides input to a DW 17 902q for illustration named "brokerAlertsAggr".

For illustration, the remote ESP model 716 is designed to search for the following violations:

A front running buy where a broker buys a stock for himself, then buys the same stock for a client, then sells the stock for a profit.

A front running sell where a broker sells a stock for himself, then sells the same stock for a client.

A restricted trade where a trade was made of a stock that was restricted at a certain venue.

An open marking where a trade was made within 60 seconds of venue open and the quantity is more than 30,000.

A close marking where a trade was made within 60 seconds of venue close and the quantity is more than 70,000.

Several dimensional windows are used to join the trade data injected into SW 4 900d with broker information injected into SW 3 900c, with trading venue information injected into SW 2 900b, and with information on what stocks are not allowed to be traded from what venues that is injected into SW 1 900a. The violation counts and broker alerts are output to event subscribing device 500 of event subscribing system 108 based on the subscription selected by event subscribing application 522.

Referring again to FIG. 8, in an operation 808, manager ESP model 718 consisting of source windows and input publishing connectors corresponding to the defined raw sources is created from manager configuration file 714. Typically, manager ESP model 718 includes one project that has one or more source windows that are constructed as follows. The schema of the window is inferred from remote ESP model 716. The source window also includes connectors that are constructed based on raw sources defined in ESP model 718. The raw sources' orchestration information provided in ESP model 718 is used to construct the project-connectors section in the created model.

Manager ESP model 718 includes a definition of an ESP model to execute at cluster manager device 104 using ESPE manager 400m. For illustration, a sample manager ESP model 718 created based on the sample manager configuration file 714 and the sample remote ESP model 716 above may recite:

```
<engine>
 <project name='esp_map10' pubsub='auto' threads='10'>
  <contqueries>
   <contquery name='query'>
    <windows>
     <window-source name='tradesInput'>
      <schema-string>id*:int64,symbol:string,currency:int32,time:int64,
       msecs:int32,price:double,quant:int32,venue:int32,broker:int32,
       buyer:int32,seller:int32,buysellflg:int32
      </schema-string>
      <connectors>
       <connector class='fs' name='connector'>
        <properties>
         <property name='type'>pub</property>
         <property name='fstype'>csv</property>
         <property name='fsname'> trades.csv</property>
        </properties>
       </connector>
      </connectors>
     </window-source>
     <window-source insert-only='true' name='brokersInput'>
      <schema>
       <fields>
        <field name='broker' type='int32' key='true'/>
        <field name='brokerName' type='string'/>
        <field name='brokerage' type='string'/>
        <field name='brokerAddress' type='string'/>
        <field name='brokerEmail' type='string'/>
        <field name='brokerPhone' type='string'/>
        <field name='brokerSms' type='string'/>
        <field name='brokerMms' type='string'/>
       </fields>
      </schema>
      <connectors>
       <connector class='fs' name='connector'>
        <properties>
         <property name='type'>pub</property>
         <property name='fstype'>csv</property>
         <property name='fsname'> brokers.csv</property>
        </properties>
       </connector>
      </connectors>
     </window-source>
     <window-source insert-only='true' name='venuesInput'>
      <schema- string>
       venue*:int32,openTimeGMT:string,
       closeTimeGMT:string</schema-string>
      <connectors>
       <connector class='fs' name='connector'>
        <properties>
         <property name='type'>pub</property>
         <property name='fstype'>csv</property>
         <property name='fsname'> venues.csv</property>
        </properties>
       </connector>
      </connectors>
     </window-source>
     <window-source insert-only='true' name='restrictedInput'>
      <schema-string>symbol*:string,venue*:int32,
       restricted:int32</schema-string>
      <connectors>
       <connector class='fs' name='connector'>
        <properties>
         <property name='type'>pub</property>
         <property name='fstype'>csv</property>
         <property name='fsname'> restricted.csv</property>
        </properties>
       </connector>
      </connectors>
     </window-source>
    </windows>
   </contquery>
  </contqueries>
  <project-connectors>
   <connector-groups>
    <connector-group name='G1'>
     <connector-entry connector='query/brokersInput/connector'
      state='finished'/>
     <connector-entry connector='query/venuesInput/connector'
      state='finished'/>
     <connector-entry connector='query/restrictedInput/connector'
      state='finished'/>
    </connector-group>
    <connector-group name='G2'>
     <connector-entry connector='query/tradesInput/connector'
      state='finished'/>
    </connector-group>
   </connector-groups>
   <edges>
    <edge source='G1' target='G2'/>
   </edges>
  </project-connectors>
 </project>
</engine>
```

In the illustrative embodiment, "esp-map10" is internally used as the project name in the generated model. It comes from the esp-map name defined in manager ESP model 718, i.e., each esp-map in manager ESP model 718 corresponds to a project in the generated model. The "schema-string" attribute is defined from the "window-source" "schema" fields attribute defined in remote ESP model 716 for the source window. For example, the string "id*:int64,symbol: string,currency:int32,time:int64,msecs:int32, price:double, quant:int32,venue:int32,broker:int32,buyer:int32,seller: int32, buysellflg:int32 defined for the "schema-string" defined for the "schema-string" attribute of the source window named "tradesInput" in manager ESP model 718 is defined from the "fields" "field" attributes of the "schema" for the source window named "tradesInput" read from remote ESP model 716. The full set of inputs read from remote ESP model 716 and summarized above is shown below for illustration:

```
<window-source name='tradesInput' insert-only='true'
 index='pi_EMPTY'>
 <schema>
  <fields>
   <field name='id' type='int64' key='true'/>
   <field name='symbol' type='string'/>
   <field name='currency' type='int32'/>
   <field name='time' type='int64'/>
   <field name='msecs' type='int32'/>
   <field name='price' type='double'/>
   <field name='quant' type='int32'/>
   <field name='venue' type='int32'/>
   <field name='broker' type='int32'/>
   <field name='buyer' type='int32'/>
   <field name='seller' type='int32'/>
   <field name='buysellflg' type='int32'/>
   <field name='tradetime' type='stamp'/>
  </fields>
 </schema>
</window-source>
```

In an operation 810, ESPE manager 400m is instantiated at cluster manager device 104 by executing manager ESP model 718 by manager engine 722.

In an operation 812, the engine container is created. For illustration, ESPE manager 400m may be instantiated using a function call that specifies the engine container as a manager for the model. The function call may include the engine name for ESPE manager 400m that may be unique to ESPE manager 400m.

In an operation 814, the one or more projects 402 defined by manager ESP model 718 are instantiated by ESPE manager 400m as a model. Instantiating the one or more projects 402 also instantiates the one or more continuous queries 404, the one or more source windows 406, and the one or more derived windows 408 defined from manager ESP model 718. The one or more continuous queries 404 may be instantiated with a dedicated thread pool or pools that generate updates as new event block objects stream through ESPE manager 400m.

In an operation 816, the pub/sub capability is initialized for ESPE manager 400m. In an illustrative embodiment, the pub/sub capability is initialized for each project of the one or more projects 402 defined by manager ESP model 718. To initialize and enable pub/sub capability for ESPE manager 400m, a host name and a port number are provided. The port number may be provided from the command line "pubsub" parameter "port" value.

In an operation 818, the one or more projects 402 defined in manager ESP model 718 are started. The one or more started projects may run in the background on cluster manager device 104. An illustrative command may be "dfesp_xml_client-url 'http://localhost:46001/SASESP/projects/project/state?value=running'-put".

In an operation 820, router configuration file 720 is created and a routing table is configured with policies read from manager configuration file 714. When router engine 724 receives an event, it checks the routing table, an internal data structure, to decide where to send it of the remote ESPE A 400a. The routing table either statically defines the mapping from a source to a destination or dynamically defines a policy that can be used to decide the destination of an event. For example, a hash policy may be defined so that events are hashed, and the hash values are used to decide the destination.

An ESP router is a mechanism whereby ESP engines can be integrated as described above. For example, ESPE manager 400m can be integrated with ESPE A 400a by defining an ESP router. For illustration, a sample router configuration file 720 created based on values extracted from the sample manager configuration file 714 and the sample remote ESP model 716 above using the illustrative XML file schema for an ESP router configuration may recite:

```
<engine>
 <esp-routers>
  <esp-router name='esp_map10'>
   <esp-engines>
    <esp-engine name='esp1' host='localhost'
    port='41003' ha_port='41001'/>
     <esp-engine name='esp2' host='localhost'
     port='41006' ha_port='41004'/>
     <esp-engine name='esp3' host='localhost'
     port='41009' ha_port='41007'/>
     <esp-engine name='esp_local' host='127.0.0.1' port='22346'/>
   </esp-engines>
   <esp-destinations>
    <multicast-destination name='brokersMap_dest5' opcode='insert'>
     <publish-target>
      <project-func>project</project-func>
      <contquery-func>query</contquery-func>
      <window-func>brokersInput</window-func>
      <engine-func>esp1,esp2,esp3,</engine-func>
     </publish-target>
    </multicast-destination>
    <multicast-destination name='venuesMap_dest2' opcode='insert'>
     <publish-target>
      <project-func>project</project-func>
      <contquery-func>query</contquery-func>
      <window-func>venuesInput</window-func>
      <engine-func>esp1,esp2,esp3,</engine-func>
     </publish-target>
    </multicast-destination>
    <multicast-destination name='restrictedMap_dest3'
    opcode='insert'>
     <publish-target>
      <project-func>project</project-func>
      <contquery-func>query</contquery-func>
      <window-func>restrictedInput</window-func>
      <engine-func>esp1,esp2,esp3,</engine-func>
     </publish-target>
    </multicast-destination>
    <multicast-destination name='tradesMap_dest4' opcode='insert'>
     <publish-target>
      <project-func>project</project-func>
      <contquery-func>query</contquery-func>
      <window-func>tradesInput</window-func>
      <engine-func>esp1,esp2,esp3,</engine-func>
     </publish-target>
    </multicast-destination>
   </esp-destinations>
   <esp-routes>
    <esp-route name='brokersMap' to='brokersMap_dest5'>
     <engine-expr>esp_local</engine-expr>
     <project-expr>esp_map10</project-expr>
     <query-expr>query</query-expr>
     <window-expr>brokersSource</window-expr>
    </esp-route>
    <esp-route name='venuesMap' to='venuesMap_dest2'>
     <engine-expr>esp_local</engine-expr>
     <project-expr>esp_map10</project-expr>
     <query-expr>query</query-expr>
     <window-expr>venuesSource</window-expr>
    </esp-route>
    <esp-route name='restrictedMap' to='restrictedMap_dest3'>
     <engine-expr>esp_local</engine-expr>
     <project-expr>esp_map10</project-expr>
     <query-expr>query</query-expr>
     <window-expr>restrictedSource</window-expr>
    </esp-route>
    <esp-route name='tradesMap' to='tradesMap_dest4'>
     <engine-expr>esp_local</engine-expr>
     <project-expr>esp_map10</project-expr>
     <query-expr>query</query-expr>
     <window-expr>trades</window-expr>
    </esp-route>
   </esp-routes>
  </esp-router>
 </esp-routers>
</engine>
```

"Esp_local" specifies ESPE manager 400m. "Esp_local" is automatically generated using hostname '127.0.0.1', which is equivalent to localhost, and the pubsub port specified on the command line using the -pubsub parameter. Router engine 724 subscribes from esp_local and publishes to esp1, esp2 and esp3 based on the esp-route defined.

In an operation 822, router engine 724 is instantiated. For example, router engine 724 can be instantiated by executing a PUT request such as $DFESP_HOME/bin/dfesp_xml_client-url "http://host:port/SASESP/routerEngines/router3/esp4"-put file://pRouter3engine.xml, where "pRouter3engine.xml" is a reference to the created router configuration file 720. The XML defined in "file://pRouter3engine.xml" is read from the HTTP request, used to instantiate router engine 724 by manager engine 722. Using the ESP pub/sub API, router engine 724 streams events to ESPE A 400a for processing.

In an operation 826, the one or more connectors defined in manager ESP model 718 are started, for example, by calling an associated "start" function. The started publisher connectors read event data from the specified source and inject that event data into a specific source window of ESPE manager 400m.

In an operation 828, a connection request is received from ESPE manager 400m for a source window of ESPE A 400a to which data will be published.

In an operation 830, an event block object is received by ESPE manager 400m through a connector from event publishing device 200. An event block object containing one or more event objects is injected into a source window of the one or more source windows 406 defined in manager ESP model 718.

In an operation 832, the received event block object is processed through the one or more continuous queries 404 defined in manager ESP model 718.

In an operation 833, the processed event block object is routed to ESPE A 400a of ESP cluster system 106 based on whether "multicast-destination", "roundrobin-destination", or "hash-destination" was selected for the route in manager configuration file 714 as defined in router configuration file 720. ESPE A 400a is selected from the list of active ESPE A 400a. If multicast-destination was selected the processed event block object is routed to every ESPE A 400a of ESP cluster system 106. Subscribing devices can correlate a group of subscribed event block objects back to a group of published event block objects by comparing the unique ID of the event block object that a publisher, such as event publishing device 200, attached to the event block object with the event block ID received by a subscribing device, such as event subscribing device 500. The received event block objects further may be stored, for example, in a RAM or cache type memory of third computer-readable medium 708 and/or fourth computer-readable medium 1008.

In an operation 834, a determination is made concerning whether or not a new ESPE 400 should be added to ESPE A 400a of ESP cluster system 106. If a new ESPE 400 should be added, processing continues in an operation 836. If a new ESPE 400 does not need to be added, processing continues in an operation 840.

In operation 836, a spare ESPE A 400a is selected from the spare ESPE A 400a and added to the list of active ESPE A 400a for possible routing of event block objects in operation 833.

In operation 840, a determination is made concerning whether or not an ESPE 400 should be removed from ESPE A 400a of ESP cluster system 106. If the ESPE 400 should be removed, processing continues in an operation 842. If the ESPE 400 should not be removed, processing continues in an operation 846.

In operation 842, a most recently added ESPE A 400a of ESP cluster system 106 is deleted from the list of active ESPE A 400a.

In operation 846, a determination is made concerning whether or not processing is stopped. If processing is not stopped, processing continues in operation 830 to continue receiving the one or more event streams containing event block objects from event publishing system 102. If processing is stopped, processing continues in an operation 848.

In operation 848, the started engines/projects/connectors are stopped and ESPE manager 400m is shutdown.

Referring to FIG. 10, fewer, different, and additional components may be incorporated into ESP cluster device 1000. Fourth input interface 1002 provides the same or similar functionality as that described with reference to input interface 202 of event publishing device 200 though referring to ESP cluster device 1000. Fourth output interface 1004 provides the same or similar functionality as that described with reference to output interface 204 of event publishing device 200 though referring to ESP cluster device 1000. Fourth communication interface 1006 provides the same or similar functionality as that described with reference to communication interface 206 of event publishing device 200 though referring to ESP cluster device 1000. Data and messages may be transferred between ESP cluster device 1000 and cluster manager device 104 and/or event subscribing system 108 using fourth communication interface 1006. Fourth computer-readable medium 1008 provides the same or similar functionality as that described with reference to computer-readable medium 208 of event publishing device 200 though referring to ESP cluster device 1000. Fourth processor 1010 provides the same or similar functionality as that described with reference to processor 210 of event publishing device 200 though referring to ESP cluster device 1000.

ESP application 1012 performs operations associated with coordinating and controlling the performance of analytics on events streamed originally by event publishing system 102 through cluster manager device 104 and with sending the processed event data to event subscribing system 108 based on a subscription request. The operations may be implemented using hardware, firmware, software, or any combination of these methods. Referring to the example embodiment of FIG. 10, ESP application 1012 is implemented in software (comprised of computer-readable and/or computer-executable instructions) stored in fourth computer-readable medium 1008 and accessible by fourth processor 1010 for execution of the instructions that embody the operations of ESP application 1012. ESP application 1012 may be written using one or more programming languages, assembly languages, scripting languages, etc. ESP application 1012, for example, may be implemented as a Web application. For illustration, ESP application 1012 may be implemented using and/or integrated with the SAS® Event Stream Processing Engine developed and provided by SAS Institute Inc. of Cary, N.C., USA.

Figure 11:
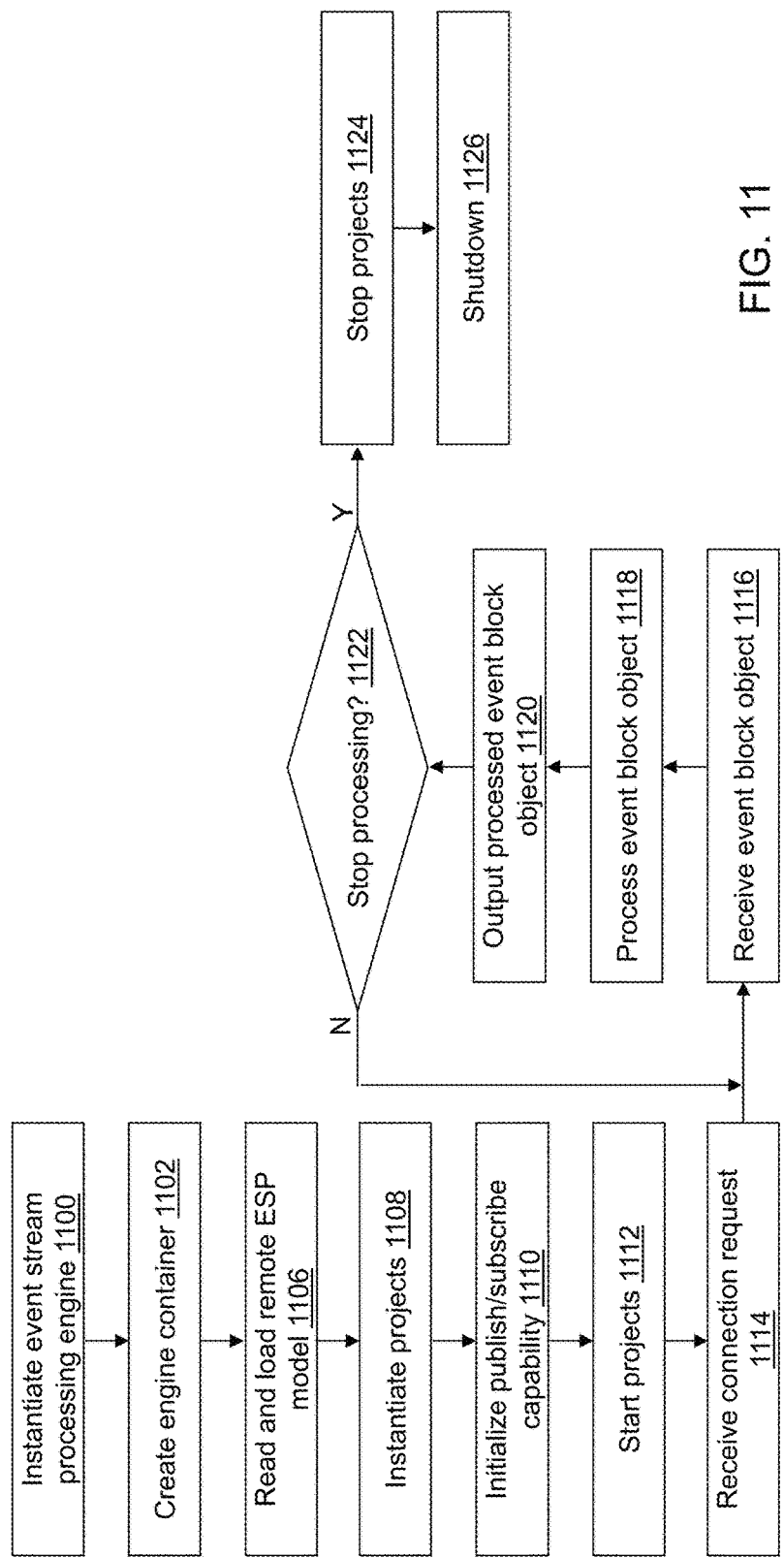
FIG. 11 depicts a flow diagram illustrating examples of operations performed by the ESP cluster device of FIG. 10 in accordance with an illustrative embodiment.

Referring to FIG. 11, example operations associated with ESP application 1012 are described. Additional, fewer, or different operations may be performed depending on the embodiment. The order of presentation of the operations of FIG. 11 is not intended to be limiting.

In an operation 1100, ESPE A 400a is started at ESP cluster device 1000.

In an operation 1102, the engine container is created. For illustration, ESPE A 400a may be instantiated using a function call that specifies the engine container as a manager for the model. The function call may include the engine name for ESPE A 400a that may be unique to ESPE A 400a.

In an operation 1104, remote ESP model 716 is and may be stored locally to fourth computer-readable medium 1008 as remote ESP model A 716a.

In an operation 1106, remote ESP model A 716a is received from cluster manager device 104, read and stored locally to fourth computer-readable medium 1008.

In an operation 1108, the one or more projects 402 defined by remote ESP model A 716a are instantiated. Instantiating the one or more projects 402 also instantiates the one or more continuous queries 404, the one or more source windows 406, and the one or more derived windows 408 defined from remote ESP model A 716a. The one or more continuous queries 404 defined from remote ESP model A 716a may be instantiated with a dedicated thread pool or pools that generate updates as new event block objects stream through ESPE A 400a. Based on remote ESP model A 716a, ESPE A 400a may analyze and process events in motion or event streams. Instead of storing events and running queries against the stored events, ESPE A 400a may store queries and stream events through them to allow continuous analysis of data as it is received. The one or more source windows 406 and the one or more derived windows 408 defined from remote ESP model A 716*a* may be created based on the relational, pattern matching, and procedural algorithms that transform the input event streams into the output event streams to model, simulate, score, test, predict, etc. based on the continuous query model defined by remote ESP model A 716*a* and application to the streamed data.

In an operation 1110, the pub/sub capability is initialized for ESPE A 400*a*. In an illustrative embodiment, the pub/sub capability is initialized for each project of the one or more projects 402. To initialize and enable pub/sub capability for ESPE A 400*a*, a host name and a port number are provided. The host name and the port number of ESP cluster device 1000 may be read from remote ESP model A 716*a*. Pub/sub clients can use a host name and the port number of ESP cluster device 1000 to establish pub/sub connections to ESPE A 400*a*. For example, a server listener socket is opened for the port number to enable cluster manager device 104 and event subscribing system 108 to connect to ESPE A 400*a* for pub/sub services. The host name and the port number of ESP cluster device 1000 to establish pub/sub connections to ESPE A 400*a* may be referred to as the host:port designation of ESPE A 400*a* executing on ESP cluster device 1000.

In an operation 1112, the one or more projects 402 defined from remote ESP model A 716*a* are started. The one or more started projects may run in the background on ESP cluster device 1000.

In an operation 1114, a connection request is received from ESPE manager 400*m* executing on cluster manager device 104 for a source window to which data will be published. A connection request further is received from a computing device of event subscribing system 108, for example, from event subscribing device 500.

In an operation 1116, an event block object is received from ESPE manager 400*m*. An event block object containing one or more event objects is injected into a source window of the one or more source windows 406 defined from remote ESP model A 716*a*.

In an operation 1118, the received event block object is processed through the one or more continuous queries 404. For example, illustrative processing details are described referring to FIG. 9. The unique ID assigned to the event block object by event publishing device 200 is maintained as the event block object is passed through ESPE manager 400*m* and between the one or more source windows 406 and/or the one or more derived windows 408 of ESPE A 400*a*. A unique embedded transaction ID further may be embedded in the event block object as the event block object is processed by a continuous query. ESPE A 400*a* maintains the event block containership aspect of the received event blocks from when the event block is published into a source window and works its way through the directed graph defined by the one or more continuous queries 404 with the various event translations before being output to event subscribing system 108.

In an operation 1120, the processed event block object is output to one or more subscribing devices of event subscribing system 108 such as event subscribing device 500. Subscribing devices can correlate a group of subscribed event block objects back to a group of published event block objects by comparing the unique ID of the event block object that a publisher, such as event publishing device 200, attached to the event block object with the event block ID received by a subscribed, such as event subscribing device 500. The received event block objects further may be stored, for example, in a RAM or cache type memory of fourth computer-readable medium 1008.

In an operation 1122, a determination is made concerning whether or not processing is stopped. If processing is not stopped, processing continues in operation 1116 to continue receiving the one or more event streams containing event block objects from ESPE manager 400*m*. If processing is stopped, processing continues in an operation 1124.

In operation 1124, the started projects are stopped.

In operation 1126, ESPE A 400*a* is shutdown.

Stream processing system 100 may support failover. A group of cluster manager devices 104 can form a cluster with one of them being an active cluster manager device 104 and the others being standby cluster manager devices 104. The active cluster manager device 104 may be referred to as a leader, and it is started as described above referring to FIG. 8 without knowing the existence of standby cluster manager devices 104. Each standby cluster manager device 104 may be started with a command line argument: -standby $host: $port, where $host is the hostname or IP address of the active cluster manager device 104 and $port is its http-admin port.

When each standby cluster manager device 104 starts, it sends a join message to the leader to notify it of its existence and set its pubsub clients to inactive. The leader periodically sends an update message to each standby cluster manager device 104 to confirm it remains "alive". The update message includes information for all of the standby cluster manager devices 104 that have sent the join message to the leader. If a standby cluster manager device 104 misses a certain number of consecutive update messages (e.g., default may be three though it may be configurable), it assumes the leader is not available and immediately starts an election process to select a new leader from among the standby cluster manager devices 104. The new leader becomes the active cluster manager device 104, sets its pubsub clients to active, and sends update messages periodically to the remaining standby cluster manager devices 104. Each update message may be sent a predefined period such as every 3 seconds.

Cluster manager failover guarantees that a message from event publishing device 200 is delivered to a target once and only once. A pubsub client when in inactive mode, maintains a sliding window that queues the event block objects from event publishing device 200 instead of sending the event block objects to the targets. When the pubsub clients of the new leader become active, they query the targets to obtain the ID of the last received message and rewind the events queued in the sliding window to replay the messages that have not been correctly received.

Stream processing system 100 provides a dynamic process by which data can be streamed from event publishers to event subscribers using manager configuration file 714 and remote ESP model 716. After starting remote ESPE A 400*a* at each ESP cluster device 1000 using remote ESP model A 716*a* created from remote ESP model 716, manager application 712 can be controlled to:

deploy projects to ESPE A 400*a* through an administrative REST API to the HTTP server;

start one or more data sources of event publishing system 102 in an orchestrated fashion;

stream events for processing and analyzing through the pub/sub API of ESPE manager 400*m*; and dynamically add or remove ESPE A 400*a* of ESP cluster system 106 using manager configuration file 714.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:
    create a local event stream processing (ESP) model based on information read from a manager configuration file, wherein the local ESP model describes first computational processes to be performed on one or more first fields of an event block object when the event block object is received by the first computing device from a second computing device remote from the first computing device, wherein the manager configuration file includes first connection information to connect the second computing device and the first computing device;
    instantiate an ESP engine (ESPE) on the first computing device based on the created local ESP model;
    receive the event block object from the second computing device in a first source window of the instantiated ESPE, wherein the first source window is defined by the created local ESP model;
    process the received event block object based on the created local ESP model;
    deploy a remote ESP model to a third computing device remote from the first computing device and from the second computing device, wherein the remote ESP model describes second computational processes to be performed on one or more second fields of the processed event block object when the processed event block object is received by the third computing device from the first computing device, wherein the manager configuration file further includes an indicator of the remote ESP model and second connection information to connect the third computing device and the first computing device;
    select the third computing device to receive the processed event block object; and
    publish the processed event block object to a second source window defined by the remote ESP model deployed to the third computing device.

2. The non-transitory computer-readable medium of claim 1, comprising computer-readable instructions that further cause the first computing device to:
    create a router configuration file based on information read from the manager configuration file, wherein the router configuration file describes routing of the event block object from the second computing device to the third computing device; and
    instantiate a router engine on the first computing device based on the created router configuration file;
    wherein the instantiated router engine selects the third computing device to receive the processed event block object based on the created router configuration file; and
    publishes the processed event block object to the second source window based on the created router configuration file.

3. The non-transitory computer-readable medium of claim 2, wherein the instantiated router engine selects the third computing device from a plurality of remote computing devices.

4. The non-transitory computer-readable medium of claim 3, wherein, when the router configuration file indicates that the event block object from the second computing device is multicast, the instantiated router engine selects each of the plurality of remote computing devices; and publishes the processed event block object to the second source window at each of the plurality of remote computing devices.

5. The non-transitory computer-readable medium of claim 3, wherein, when the router configuration file indicates that the event block object from the second computing device is sent to a single computing device, the instantiated router engine selects the third computing device from the plurality of remote computing devices.

6. The non-transitory computer-readable medium of claim 5, wherein the third computing device is selected from the plurality of remote computing devices by successively selecting a different computing device from the plurality of remote computing devices to which to publish the event block object.

7. The non-transitory computer-readable medium of claim 5, wherein the third computing device is selected from the plurality of remote computing devices by reading a value from a predefined field of the event block object and selecting the third computing device from the plurality of remote computing devices based on the read value.

8. The non-transitory computer-readable medium of claim 5, wherein the third computing device is selected from the plurality of remote computing devices by reading a value from a predefined field of the event block object, computing a hash value from the read value, and selecting the third computing device from the plurality of remote computing devices based on the computed hash value.

9. The non-transitory computer-readable medium of claim 1, comprising computer-readable instructions that further cause the first computing device to:
    create a router configuration file based on information read from the manager configuration file, wherein the router configuration file describes routing of the event block object from the second computing device to the third computing device; and
    instantiate a router engine on the first computing device based on the created router configuration file;
    wherein the instantiated router engine starts a connector between the first computing device and the second computing device to receive the event block object based on the created router configuration file.

10. The non-transitory computer-readable medium of claim 9, wherein the instantiated router engine starts a plurality of connectors between the first computing device and a plurality of publishing computing devices that each receive different event block objects, wherein the second computing device is one of the plurality of publishing computing devices.

11. The non-transitory computer-readable medium of claim 10, wherein the plurality of connectors are started in an order determined from the created router configuration file.

12. The non-transitory computer-readable medium of claim 10, wherein a group of the plurality of connectors is started together based on the created router configuration file.

13. The non-transitory computer-readable medium of claim 10, wherein a second connector of the plurality of connectors is started after the connector is started based on the created router configuration file.

14. The non-transitory computer-readable medium of claim 10, wherein a second connector of the plurality of connectors is started after the connector is indicated as finished processing based on the created router configuration file.

15. The non-transitory computer-readable medium of claim 10, wherein a second connector of the plurality of connectors is started after the connector is indicated as stopped processing based on the created router configuration file.

16. A first computing device comprising:
a processor; and
a computer-readable medium operably coupled to the processor, the computer-readable medium having computer-readable instructions stored thereon that, when executed by the processor, cause the first computing device to
create a local event stream processing (ESP) model based on information read from a manager configuration file, wherein the local ESP model describes first computational processes to be performed on one or more first fields of an event block object when the event block object is received by the first computing device from a second computing device remote from the first computing device, wherein the manager configuration file includes first connection information to connect the second computing device and the first computing device;
instantiate an ESP engine (ESPE) on the first computing device based on the created local ESP model;
receive the event block object from the second computing device in a first source window of the instantiated ESPE, wherein the first source window is defined by the created local ESP model;
process the received event block object based on the created local ESP model;
deploy a remote ESP model to a third computing device remote from the first computing device and from the second computing device, wherein the remote ESP model describes second computational processes to be performed on one or more second fields of the processed event block object when the processed event block object is received by the third computing device from the first computing device, wherein the manager configuration file further includes an indicator of the remote ESP model and second connection information to connect the third computing device and the first computing device;
select the third computing device to receive the processed event block object; and
publish the processed event block object to a second source window defined by the remote ESP model deployed to the third computing device.

17. The first computing device of claim 16, wherein the computer-readable medium further comprises computer-readable instructions that cause the first computing device to:
create a router configuration file based on information read from the manager configuration file, wherein the router configuration file describes routing of the event block object from the second computing device to the third computing device; and
instantiate a router engine on the first computing device based on the created router configuration file;
wherein the instantiated router engine selects the third computing device to receive the processed event block object based on the created router configuration file; and
publishes the processed event block object to the second source window based on the created router configuration file.

18. The first computing device of claim 17, wherein the instantiated router engine selects the third computing device from a plurality of remote computing devices.

19. The first computing device of claim 16, wherein the computer-readable medium further comprises computer-readable instructions that cause the first computing device to:
create a router configuration file based on information read from the manager configuration file, wherein the router configuration file describes routing of the event block object from the second computing device to the third computing device; and
instantiate a router engine on the first computing device based on the created router configuration file;
wherein the instantiated router engine starts a connector between the first computing device and the second computing device to receive the event block object based on the created router configuration file.

20. The first computing device of claim 19, wherein the instantiated router engine starts a plurality of connectors between the first computing device and a plurality of publishing computing devices that each receive different event block objects, wherein the second computing device is one of the plurality of publishing computing devices.

21. The first computing device of claim 20, wherein the plurality of connectors are started in an order determined from the created router configuration file.

22. A method of managing a cluster of event stream processing engines, the method comprising:
creating, by a first computing device, a local event stream processing (ESP) model based on information read from a manager configuration file, wherein the local ESP model describes first computational processes to be performed on one or more first fields of an event block object when the event block object is received by the first computing device from a second computing device remote from the first computing device, wherein the manager configuration file includes first connection information to connect the second computing device and the first computing device;
instantiating, by the first computing device, an ESP engine (ESPE) on the first computing device based on the created local ESP model;

receiving, by the first computing device, the event block object from the second computing device in a first source window of the instantiated ESPE, wherein the first source window is defined by the created local ESP model;

processing, by the first computing device, the received event block object based on the created local ESP model;

deploying, by the first computing device, a remote ESP model to a third computing device remote from the first computing device and from the second computing device, wherein the remote ESP model describes second computational processes to be performed on one or more second fields of the processed event block object when the processed event block object is received by the third computing device from the first computing device, wherein the manager configuration file further includes an indicator of the remote ESP model and second connection information to connect the third computing device and the first computing device;

selecting, by the first computing device, the third computing device to receive the processed event block object; and publishing, by the first computing device, the processed event block object to a second source window defined by the remote ESP model deployed to the third computing device.

23. The method of claim 22, further comprising:

creating, by the first computing device, a router configuration file based on information read from the manager configuration file, wherein the router configuration file describes routing of the event block object from the second computing device to the third computing device; and instantiating, by the first computing device, a router engine on the first computing device based on the created router configuration file;

wherein the instantiated router engine selects the third computing device to receive the processed event block object based on the created router configuration file; and publishing, by the first computing device, the processed event block object to the second source window based on the created router configuration file.

24. The method of claim 23, wherein the instantiated router engine selects the third computing device from a plurality of remote computing devices.

25. The method of claim 24, wherein, when the router configuration file indicates that the event block object from the second computing device is multicast, the instantiated router engine selects each of the plurality of remote computing devices; and publishes the processed event block object to the second source window at each of the plurality of remote computing devices.

26. The method of claim 24, wherein, when the router configuration file indicates that the event block object from the second computing device is sent to a single computing device, the instantiated router engine selects the third computing device from the plurality of remote computing devices.

27. The method of claim 22, further comprising:

creating, by the first computing device, a router configuration file based on information read from the manager configuration file, wherein the router configuration file describes routing of the event block object from the second computing device to the third computing device; and instantiating, by the first computing device, a router engine on the first computing device based on the created router configuration file;

wherein the instantiated router engine starts a connector between the first computing device and the second computing device to receive the event block object based on the created router configuration file.

28. The method of claim 27, wherein the instantiated router engine starts a plurality of connectors between the first computing device and a plurality of publishing computing devices that each receive different event block objects, wherein the second computing device is one of the plurality of publishing computing devices.

29. The method of claim 28, wherein the plurality of connectors are started in an order determined from the created router configuration file.

30. The method of claim 28, wherein a group of the plurality of connectors is started together based on the created router configuration file.

* * * * *